US012640485B2

(12) United States Patent
Garcia Tejero et al.

(10) Patent No.: US 12,640,485 B2
(45) Date of Patent: May 26, 2026

(54) POLARIZATOPM-MODIFYING WAVEGUIDE ANTENNA DEVICE

(71) Applicant: HUBER+SUHNER AG, Herisau (CH)

(72) Inventors: Alejandro Garcia Tejero, St. Gallen (CH); Pietro Romano, Rorschach (CH); Francesco Merli, St. Gallen (CH)

(73) Assignee: HUBER+SUHNER AG, Herisau (CH)

( * ) Notice: Subject to any disclaimer, the term of this patent is extended or adjusted under 35 U.S.C. 154(b) by 0 days.

(21) Appl. No.: 18/038,372

(22) PCT Filed: Nov. 17, 2021

(86) PCT No.: PCT/EP2021/081922
§ 371 (c)(1),
(2) Date: May 23, 2023

(87) PCT Pub. No.: WO2022/122319
PCT Pub. Date: Jun. 16, 2022

(65) Prior Publication Data

US 2023/0420857 A1 Dec. 28, 2023

(30) Foreign Application Priority Data

Dec. 8, 2020 (CH) ..................................... 01558/20
Jul. 9, 2021 (CH) ............................... 070033/2021

(51) Int. Cl.
*H01Q 13/02* (2006.01)
*H01Q 1/32* (2006.01)
(Continued)

(52) U.S. Cl.
CPC ....... *H01Q 13/0233* (2013.01); *H01Q 1/3233* (2013.01); *H01Q 15/246* (2013.01); *H01Q 21/005* (2013.01); *H01Q 21/064* (2013.01)

(58) Field of Classification Search
CPC ............. H01Q 13/0233; H01Q 1/3233; H01Q 15/246; H01Q 21/005; H01Q 21/064;
(Continued)

(56) References Cited

U.S. PATENT DOCUMENTS 3,224,004 A 12/1965 Barthez
4,638,323 A 1/1987 Shnitkin et al.
(Continued)

FOREIGN PATENT DOCUMENTS

CN 1052 29858 A 1/2016
CN 110994080 A 4/2020
(Continued)

OTHER PUBLICATIONS

EPO Communication Pursuant to Rule 114(2) EPC—Third Part Observations—European Patent Application No. 20210815436, Jun. 6, 2024, (1 page).
(Continued)

*Primary Examiner* — Dameon E Levi
*Assistant Examiner* — Jordan E. DeWitt
(74) *Attorney, Agent, or Firm* — Pauley Erickson & Swanson

(57) ABSTRACT

An antenna device (1) including a printed circuit board (2) and a thereon arranged electronic component (3). The antenna device (1) includes at least two individual antenna elements (12) which are interconnected to the electronic component (3) configured to transmit and receive a signal. The antenna elements (12) each include at least one waveguide channel (9) interconnecting in the antenna assembly (6). A first waveguide aperture (10) is arranged at a back face (16) of the antenna assembly (6). The first waveguide aperture (10) is interconnected to the electronic component (3) and configured to transmit and/or receive a signal. A second waveguide aperture (11) is arranged at a front face
(Continued)

(17) of the waveguide assembly (6) and is also configured to transmit and/or receive a signal.

18 Claims, 19 Drawing Sheets

(51) Int. Cl.
*H01Q 15/24* (2006.01)
*H01Q 21/00* (2006.01)
*H01Q 21/06* (2006.01)

(58) Field of Classification Search
CPC .... H01Q 21/0037; H01Q 23/00; G01S 7/027; G01S 7/03; G01S 13/931
See application file for complete search history.

(56) References Cited

U.S. PATENT DOCUMENTS

| | | | | |
|---|---|---|---|---|
| 5,380,386 | A | 1/1995 | Oldham et al. | |
| 5,600,336 | A * | 2/1997 | Kubo | H01Q 5/45 333/248 |
| 5,638,079 | A | 6/1997 | Kastner et al. | |
| 6,166,701 | A * | 12/2000 | Park | H01Q 21/005 343/756 |
| 6,535,173 | B2 | 3/2003 | Ou | |
| 7,148,766 | B2 * | 12/2006 | Tong | H01P 1/209 333/230 |
| 7,724,197 | B1 * | 5/2010 | Hardie | H01Q 3/40 343/754 |
| 8,098,207 | B1 * | 1/2012 | Herting | H01Q 1/52 343/774 |
| 9,682,117 | B2 | 6/2017 | Iwanaka | |
| 9,812,784 | B2 | 11/2017 | Park et al. | |
| 10,082,570 | B1 | 9/2018 | Izadian et al. | |
| 10,218,075 | B1 | 2/2019 | Smith | |
| 10,276,944 | B1 * | 4/2019 | Izadian | H01Q 21/068 |
| 10,439,298 | B2 | 10/2019 | Kirino et al. | |
| 10,693,236 | B2 | 6/2020 | Brown | |
| 10,826,166 | B2 | 11/2020 | Chen et al. | |
| 10,845,476 | B2 | 11/2020 | Izadian et al. | |
| 10,938,083 | B2 | 3/2021 | Izadian et al. | |
| 11,196,178 | B2 * | 12/2021 | Fleancu | H01Q 1/24 |
| 11,482,792 | B2 | 10/2022 | Lim et al. | |
| 2010/0060537 | A1 | 3/2010 | Nagayama | |
| 2010/0259346 | A1 * | 10/2010 | Runyon | H01Q 21/24 333/248 |
| 2010/0321265 | A1 | 12/2010 | Yamaguchi et al. | |
| 2012/0321246 | A1 | 12/2012 | Pomerene et al. | |
| 2013/0278474 | A1 * | 10/2013 | Lenormand | H01Q 13/22 343/756 |
| 2017/0271776 | A1 | 9/2017 | Biancotto et al. | |
| 2018/0034140 | A1 * | 2/2018 | Chen | H01Q 9/0485 |
| 2018/0375218 | A1 * | 12/2018 | Kamo | H01Q 13/0283 |
| 2019/0187247 | A1 * | 6/2019 | Izadian | G01S 7/025 |
| 2019/0296443 | A1 * | 9/2019 | Kirino | H01P 3/123 |
| 2019/0348740 | A1 * | 11/2019 | Seo | H01P 5/107 |
| 2019/0363454 | A1 * | 11/2019 | Forati | H01P 5/12 |
| 2020/0006865 | A1 * | 1/2020 | Adada | H01Q 3/30 |
| 2020/0059000 | A1 | 2/2020 | Kamo et al. | |
| 2020/0127358 | A1 | 4/2020 | de Rijk et al. | |
| 2020/0185802 | A1 | 6/2020 | Vilenskiy et al. | |
| 2020/0185804 | A1 * | 6/2020 | Watanabe | G01S 13/584 |
| 2020/0266510 | A1 * | 8/2020 | Menargues Gomez | H01P 1/163 |
| 2020/0321265 | A1 | 10/2020 | Bellus et al. | |
| 2020/0363498 | A1 * | 11/2020 | Brown | H01P 5/107 |
| 2020/0365976 | A1 | 11/2020 | Izadian | |
| 2021/0194150 | A1 * | 6/2021 | Lim | G01S 7/03 |
| 2023/0420857 | A1 * | 12/2023 | Garcia Tejero | G01S 7/027 |
| 2024/0243465 | A1 * | 7/2024 | Kowalewski | G01S 7/032 |
| 2024/0280623 | A1 * | 8/2024 | Thiesies | H01P 1/165 |

FOREIGN PATENT DOCUMENTS

| | | | |
|---|---|---|---|
| CN | 210576434 | U | 5/2020 |
| CN | 107394417 | B | 8/2020 |
| CN | 111600133 | A | 8/2020 |
| CN | 111653855 | A | 9/2020 |
| EP | 1 930 982 | B1 | 10/2010 |
| EP | 2 676 327 | B1 | 7/2018 |
| EP | 3 430 685 | B8 | 6/2020 |
| JP | 2004/363764 | A | 12/2004 |
| JP | 5616927 | B2 | 10/2014 |
| JP | 2017/147725 | A | 8/2017 |
| JP | 2018/164252 | A | 10/2018 |
| JP | 2019/537388 | A | 12/2019 |
| WO | WO 2012/110366 | A1 | 8/2012 |
| WO | WO 2015/169469 | A1 | 11/2015 |
| WO | WO 2017/158020 | A1 | 9/2017 |
| WO | WO 2017/167916 | A1 | 10/2017 |
| WO | WO 2017/175782 | A1 | 10/2017 |
| WO | WO 2018/001921 | A1 | 1/2018 |
| WO | WO 2018/022295 | A1 | 2/2018 |
| WO | WO2019/008852 | A1 | 1/2019 |
| WO | WO 2020/159414 | A1 | 8/2020 |
| WO | WO 2020/188093 | A1 | 9/2020 |
| WO | WO 2022/184835 | A1 | 9/2022 |

OTHER PUBLICATIONS

Third Party Observations re: European Patent Application No. EP20210815436, Antenna Device, Applicant: Huber+Suhner AG [CH], May 29, 2024, (7 pages).
Le Sage, G.P., et al., "3D Printed Waveguide Opening Array Antennas," IEEE Access, Mar. 21, 2016, vol. 4, pp. 1258-1265 (8 pp.).
Khazai, M., et al., "To Reduce Side Lobe Level of Slotted Array Antennas Using Nonuniform Waveguides," Int. J. RF Microw. Comput. Aided Eng., 2016, vol. 26, No. 1, pp. 42-46.
Mallahzadeh, A.R., et al., "An Ultralow Cross-Polarization opening Array Antenna in Narrow Wall of Angled Ridge Waveguide," J. Comm Eng., Autumn 2012, vol. 1, No. 1 (14 pp.).
Haddadi, A., et al., "Gap Waveguide Opening Array Antenna for Automotive Applications at E-Band," 13th EuCAP Conf., Krakow, Poland, 2019 (4 pp.).
Zarifi, D., et al., "A V-Band Low Sidelobe Cavity-Backed Opening Array Antenna Based on Gap Waveguide," 14th EuCAP Conf., Copenhagen, DK, 2020 pp. 1-3.
EPO (Rijswijk, NL), English language version of the International Search Report, Form PCT/ISA/210, for International Application PCT/EP2021/081922, Mar. 14, 2022 (2 pages).
Huber+Suhner AG, "An Antenna concept that Addresses the Challenges with Automotive Radar," IWPC 2016, Trends in Automotive Radar and Impact on System Architecture, 2016, 15 March, Munich, Germany, AUDI (11 pages).
Huber+Suhner AG, "Injection Molded Radar Antennas," IWPC 2018, New Features for Automotive Radars, 2018, 01 February, Stuttgart, Germany, DAIMIER (15 pages).
JPO, Japan Patent Office, "Japanese Office Action for Japanese Patent Application No. JP2023-526032", Issued Jul. 1, 2025 (4 pages).
CNIPO, "First Notification of Examiner's Opinion," for Chinese Application No. 202180078914.8, issued Nov. 20, 2025 (10 pages).
"A compact E-to-H plane waveguide transition at Ka band,"Proceedings of the 2015 Natl. Conf. on Microwave & Millimeter Wave, p. 958-960, Dec. 31, 2015, Sun dongquan, Xu jinping.
EPO Communication Pursuant to Rule 114(2) EPC—Third Party Observation—European Patent Application No. 21815436.7, Aug. 18, 2025 (1 page).
Third Party Observation re: European Patent Application No. 21815436.7, Antenna Device, Applicant: Huber+Suhner AG [Ch], Oct. 18, 2023 (4 pages).

* cited by examiner

POLARIZATOPM-MODIFYING WAVEGUIDE ANTENNA DEVICE

CROSS REFERENCE TO RELATED APPLICATION

This application is a National Phase filing in the United States, under 35 USC § 371, of PCT International Patent Application PCT/EP2021/081922, filed on 17 Nov. 2021 which claims the priority of Swiss Patent Application CH 01558/20, filed on 8 Dec. 2020 and Swiss Patent Application CH 070033/2021, filed 9 Jul. 2021.

The above-referenced applications are hereby incorporated by reference herein in their entirety and is made a part hereof, including but not limited to those portions which specifically appear hereinafter.

BACKGROUND OF THE INVENTION

Field of the Invention

The present invention relates to an antenna device comprising an antenna arrangement with a waveguide, e.g., for use in automotive radar applications.

Discussion of Related Art

From the prior art several radiating elements are known e.g., from WO 12110366 A1, WO 2017167916 A1, WO 2017158020 A1, WO 2018001921 A1 of the same applicant.

U.S. Ser. No. 10/218,075 BA by Waymo LLC published in 2019 describes a method involve the forming, in a first metal layer, a first half of waveguide channels including an input waveguide channel, a plurality of wave-dividing channels, and a plurality of wave-radiating channels. The method may further involve fastening the first metal layer to the second metal layer so as to substantially align the halves of the waveguide channels.

U.S. Ser. No. 10/439,298 by Nidec published in 2019 describes a opening array antenna with an electrically conductive member having an electrically conductive surface and openings therein. At least one of the conductive member and the waveguide member includes dents on the conductive surface and/or the waveguide face, the dents each serving to broaden a spacing between the conductive surface and the waveguide face relative to any adjacent site.

WO 2017175782 A1 by Nidec published in 2017 describes an antenna array which includes a conductive member having a first and second openings adjacent to each other. The conductive surface on a front side of the conductive member is shaped so as to define a first and second horns respectively communicating with the first and second openings.

CN 111600133 A by Huawei Technologies published in 2020 describes a millimeter-wave radar comprising a dielectric plate, microstrip lines, non-band impedance transformation rules, ladder-type single ridge waveguide microstrip line to interconnect structure.

US 20200185802 A1 by Samsung published in 2020 describes a ridge guide waveguide including a conductive base, a conductive ridge protruding upward from the conductive base and extending along a predetermined wave transmission direction, an upper conductive wall located over the conductive base and the conductive ridge and spaced apart from the conductive ridge by a gap, and an electromagnetic bandgap structure arranged adjacent to the conductive ridge between the conductive base and the upper conductive wall.

US 20200127358 A1 by SwissSto published in 2017 describes a waveguide device for guiding a radio frequency signal at a determined frequency, the device including a body having side walls with outer surfaces and inner surfaces, the inner surfaces defining a waveguide channel. A conductive layer covers the inner surface of the body, the conductive layer being formed of a metal having a skin depth delta at frequency and has a thickness at least twenty times as large as the skin depth delta.

WO 2020159414 A1 by Ericsson published in 2020 describes an antenna device and an antenna stack comprising at least two antenna devices. The antenna device comprises a leaky wave antenna structure comprising a waveguide structure extending in a first plane along a first axis, wherein the waveguide structure comprises two opposite end portions along the first axis, and a first feed point and a second feed point arranged at opposite end portions of the waveguide structure.

CN 107394417 B by Cn Elect Tech No 38 Res Inst published in 2017 describes a series feed network from a rectangular waveguide to a ridge waveguide. The series feed network comprises a plurality of ridge waveguide tubes and a rectangular waveguide power divider, and a common wall is formed between the ridge waveguides and the rectangular waveguide power divider and is equipped with an S-shaped gap used for communicating the ridge waveguides and the rectangular waveguide power divider.

US 20170271776 A1 by Commscope published in 2017 describes a panel array antenna comprising an input layer including a waveguide network coupling an input feed on a first side thereof to a plurality of primary coupling cavities on a second side thereof, and an output layer on the second side of the input layer.

US 20100321265 A1 by Mitsubishi published in 2010 describes a waveguide opening array antenna apparatus having a polarized wave plane in a direction oblique to a tube shaft of a waveguide, in which an excitation distribution of opening portions for radiating or receiving electromagnetic waves is appropriately attained.

CN 110994080 A by Cn Elect Tech No 38 Res Inst published in 2020 describes a opening waveguide rotary joint. The joint comprises opening waveguide transmission lines, a metal column, a coaxial waveguide converter and a metal cover plate, the metal cover plate is arranged corresponding to the plurality of opening waveguide transmission lines.

US20120321246A1 by BAE published in 2012 describes an asymmetric slotted waveguide and method for fabricating the same. The slotted waveguide is constructed in silicon-on-insulator using a Complementary metal-oxide-semiconductor (CMOS) process. One or more wafers can be coated with a photo resist material using a photolithographic process in order to thereby bake the wafers via a post apply bake (PAB) process.

CN111653855A by Molex Corp. published in 2020 describes A waveguide includes a tubular resin portion formed of resin, a conductor layer formed on an inner surface of the resin portion, and a fitting held by the resin portion.

Other sources are G. P. Le Sage, "3D Printed Waveguide Opening Array Antennas," in IEEE Access, vol. 4, pp. 1258-1265, 2016, doi: 10.1109/ACCESS.2016.2544278; Antenna Engineering Handbook, Richard C. Johnson, 1. Edition 1993, Mcgraw-Hill Professional; R. S. Elliott, Antenna theory and design, Prentice-Hall, Upper Saddle River, NJ, 1981; R. S. Elliott, Antenna handbook, in Y. T. Lo and S. W. Lee, Eds., The design of waveguide-fed opening arrays, Reinhold-Van Nostrand, New York, 1988; M. Khazai and M. Khalaj-Amirhosseini, "To reduce side lobe level of slotted array antennas using nonunifoim waveguides", Int. J. RF Microw. Comput. Aided Eng., vol. 26, no. 1, pp. 42-46, 2016; Mallahzadeh, A. R. & Mohammad-Ali-Nezhad, Sajad. (2012). An Ultralow Cross-Polarization Opening Array Antenna in Narrow Wall of Angled Ridge Waveguide. Journal of communication Engineering. 1; A. Haddadi, C. Bencivenni and T. Emanuelsson, "Gap Waveguide Opening Array Antenna for Automotive Applications at E-Band," 2019 13th European Conference on Antennas and Propagation (EuCAP), Krakow, Poland, 2019, pp. 1-4; and D. Zarifi, A. Farahbakhsh and A. U. Zaman, "A V-Band Low Sidelobe Cavity-Backed Opening Array Antenna Based on Gap Waveguide," 2020 14th European Conference on Antennas and Propagation (EuCAP), Copenhagen, Denmark, 2020, pp. 1-3, doi:

SUMMARY OF THE INVENTION

The use of millimeter-wave frequencies in communication devices and radar applications, e.g., in automotive, is continuously expanding. Antennas are critical components in all these fields, and come with advanced requirements in terms of performance, size, weight and compliance to environmental standards.

In terms of performance, antenna gain and efficiency are crucial parameters since they directly affect the overall system link budget (translating to link distance and coverage for communication systems, and to maximum detection range for automotive radars). Printed circuit board antennas (PCB antennas), normally used at lower frequencies, find also application at millimeter-wave frequencies. However, they typically come with a drawback in terms of performance. More specifically, PCB antennas usually comprise planar metallic structures as radiating elements. They are usually realized on top of or integrated in dielectric substrate layers. The connection of these radiating elements with a chip, respectively electronic components, foreseen for generating/receiving the power (signal) to be transmitted/received is realized through additional planar structures, namely transmission lines, such as e.g., microstrip, coplanar waveguide, stripline, which guide the signal from the chip to the radiating part.

The implementation of both these radiating elements and connections at millimeter-wave frequencies usually present a few major drawbacks: They are very lossy at millimeter-wave frequencies (especially for frequencies higher than 60 GHz) due to the particular dielectric properties of the substrate materials. These losses drastically reduce antenna efficiency/perfoiniance and, at the same time, increase the power that needs to be dissipated inside the systems. In order to compensate for these losses, more power needs to be generated by the chip if a transmitter mode is considered. However, this is not always possible as most of these applications are very sensitive in terms of maximum power that can be generated or handled by the system itself. On the receiver side, instead, these losses can be difficult to compensate with direct impact on the receiver sensitivity which negatively affects detection range (e.g., for radar systems) or link budget (e.g., for communications applications).

One additional way to compensate for the PCB losses discussed above is to increase the antenna directivity by design in order to reach the desirable ranges. Losses are almost constant, thus higher gain is achieved. Higher directivity is obtained through narrower beam width patterns that typically results in heavily reduced field of view for transmitting.

PCB antennas typically offer narrow band performance (in the order of 5%), which can represent a limitation for emerging communication networks and automotive radar applications where bandwidth up to 20% are required. In addition to that, substrate materials suitable for millimeter-wave frequencies applications are generally expensive increasing the overall system price point. All these aspects have a direct impact on overall system complexity and cost, since very high-performing components and materials need to be developed and applied.

An alternative to PCB antennas, in turn, is represented by air-filled waveguides coupled with horn antennas, open-ended waveguide radiators or openings. Generic air-filled waveguides used at microwave and millimeter-waves are hollow conductive pipes that are able to guide the electromagnetic signal from point A to point B with negligible losses (depending on the metal conductivity).

Due to their almost lossless performance at millimeter-wave frequencies (up to a factor 10 improvement if compared to standard PCBs) and wide-band potential (up to 20% fractional bandwidth), metallic waveguides coupled with horn antennas, open-ended waveguide radiators or openings in metallic layers represent a powerful combination for the implementation of high-performing antennas that can be used in millimeter-wave frequencies communications and automotive radar applications. One aspect to be considered about waveguide components is related to their size, which is directly related to the frequency of operation. More specifically, it is inversely proportional to the frequency (i.e., directly proportional to the wavelength of the propagating signal). This means that the higher the frequency the smaller become the waveguide cross sections. As an example, standard rectangular waveguides for 77 GHz operation, which is a typical frequency for automotive radars, have a cross section in the order of 3 mm×1.5 mm, which can be reduced down to a certain extent. At these frequencies (millimeter-wave) the wavelength of the propagating signal is very small (~3.9 mm at 77 GHz). Therefore, manufacturing tolerances play a fundamental role, since small mechanical variations with respect to the nominal design can generate unexpected changes to the electromagnetic properties of the guiding or radiating structure with consequent performance degradation and direct impact on overall system functionalities. The importance of manufacturing tolerances in the development of waveguide-based antennas and components poses some limitations to the way they can be built.

Standard millimeter-wave frequencies waveguide assemblies are typically manufactured using advanced machining techniques with very low tolerance requirements, like high-precision milling, micromachining, etc. However, these techniques show limitations when high-performing millimeter-wave frequencies array antennas based on air-filled waveguide technology need to be implemented, since these typically require a complex power splitting/combination network that connects the antenna feeding point with the radiating structures. Both the radiating structures and the feeding network typically include specific features that require low tolerances (in the order of tens of micron) and make it impossible to manufacture the antenna in a single piece. Moreover, these standard high-precision manufacturing techniques are expensive and barely compatible with the high mass production volumes driven by specific applications like automotive radars which overall may request several tens of millions of antennas per year.

An aspect of the disclosure is to address these manufacturing limitations/drawbacks, based on the considerable performance advantage of waveguide technology with respect, for instance, to printed circuit board (PCB).

Given the above advantages of waveguide technology in terms of performance, and considering the tight tolerance requirements for manufacturing, an aspect of the disclosure is directed to a combination of innovative radio-frequency and mechanical design with advanced manufacturing to implement high-performance millimeter-wave frequencies waveguide antennas and components, especially for automotive.

An antenna device, e.g. in the form of a radar device for automotive radar to capture the environment during autonomous driving, according to the disclosure usually comprises a printed circuit board (PCB) and a thereon arranged electronic component. The antenna device further comprises an antenna assembly comprising at least two individual antenna elements interconnected to the electronic component and configured to transmit and/or receive a signal. The electronic component can be interconnected directly to the antenna elements and/or indirectly, e.g., through a wave guiding means, such as a hollow wave guiding means. The antenna elements usually comprise each at least one waveguide channel interconnecting in the antenna assembly a first waveguide aperture, arranged at a back face of the antenna assembly, to a second waveguide aperture, arranged at a front face of the waveguide assembly. Said first waveguide aperture is interconnected to the electronic component and configured to transmit and/or receive signal from and/or to the electronic component. The second waveguide aperture, is configured to transmit and/or receive a signal to and if applicable from a remote station. The first waveguide aperture at the back face can e.g., be coupled by a planar transmission line to the electronic component through a coupling/radiating feature implemented on the PCB at the back face of the antenna assembly. The radiating apertures can be designed as funnel shaped openings, also defined as horn shaped second waveguide apertures. Good results can be achieved when a flare section interconnects the splitter and/or the waveguide channel to the horn shaped second waveguide aperture. The flare section is preferably arranged adjacent to the primary port of the splitter or the distal end of the waveguide channel.

Antenna assemblies as herein described are usually designed as highly efficient Multi-Input-Multi-Output (MIMO) arrangements, e.g., for radar applications in automotives as mentioned above. Such antenna assemblies typically require individual antenna elements which are coordinated with respect to each other for sending and/or receiving signals simultaneously and/or according to a specific pattern. Depending on the field of application, an antenna assembly therefore usually comprises at least two individual antenna elements which can be operated independently from each other. In a preferred variation each individual antenna element is interconnected to the electronic component such that, if appropriate, an individual frequency and bandwidth can be selected for each antenna element independently. Good results can be achieved, when the second waveguide opening is incorporated as several radiating openings foaming an array of radiating openings arranged at the front side of the antenna assembly as described hereinafter in detail. The several radiating openings forming together a second waveguide aperture. The several radiating opening s of an array are preferably energized by a common waveguide channel which is interconnected to a respective radiating element at the back side of the antenna assembly via a first waveguide aperture. Depending on the design, the radiating openings of the array are configured to radiate and/or receive a signal. Good results can be achieved when the radiating openings are designed as slots. Depending on the field of application, the radiating openings may have different geometries as will become apparent from the variations shown hereinafter in more detail.

Longitudinal openings with half guided wavelength spacing usually need to be offset with respect to a centerline. Such an arrangement is necessary, given the particular distribution of the electric currents that would excite the openings out of phase if they were, for instance, placed in a line. Having the openings aligned collinear or in line with respect to each other as shown in certain variations in the below noted figures, however, represents an advantage. It allows to realize symmetric patterns and avoid unwanted lobes outside of the main radiation planes. In a preferred variation, this is achieved in the present disclosure by altering the electric field and electric current distribution of the air-filled horizontal waveguide.

Preferably the radiating openings are having a funnel shaped design in vertical direction with a narrowing cross-section in inward direction before they merge into the common waveguide channel or a branch thereof. The at least one radiating opening of the first and the at least one radiating opening of the second waveguide channel branch can also be interconnected to at least one funnel, wherein the funnel is interconnected to the second waveguide aperture. This variation allows to increase the radiating surface of at least one radiating opening. In a preferred variation the funnel can be arranged in an asymmetric manner with respect to the aperture. The at least one funnel can be interconnected to the second waveguide aperture laterally displaced to achieve an asymmetric radiation pattern. The asymmetrically displaced funnel creates a tilt in the radiation properties of the antenna device. The impact of the lateral displacement can create local maxima in the antenna directivity. These local maxima can help to focus the antenna energy in certain areas. The tilted pattern can be useful to have a further range in given areas of the radar. Good results can be for example achieved in automotive applications as the tilted pattern makes it possible to have a locally wider range.

Alternatively, or in addition to the laterally displaced funnel, also the cross section of the radiating openings can be modified to influence the directivity. The first and the second waveguide channel branch each can comprise two arrays of radiating openings. Preferably, the arrays are arranged essentially parallel with respect to each other. In a preferred variation the two arrays are interconnected to at least one common funnel. Depending on the desired radiation characteristic, the common funnel can be arranged laterally offset with respect to two rows of radiating openings. Alternatively, or in addition, the radiating openings of the two rows can have varying cross sections to further tilt the radiation pattern. The difference between the cross section of the openings creates a phase difference between the radiation of each opening. The phase difference causes a tilt in the radiation of the pattern.

In a preferred variation two arrays of openings are arranged parallel with respect to each other. The cross sections of the openings of the first array are smaller/or larger than the cross sections of the openings of the second array. This configuration causes a tilt of the radiation pattern. Alternatively, the cross sections of neighboring openings within one array can be different, such that an opening with a smaller cross section is arranged adjacent to an opening with a larger cross section. Good results can be achieved when openings with smaller and larger cross sections are arranged in a line next to each other in alternating manner. This causes the radiation pattern to be compensated and radiate in a straight manner.

The increased radiating surface can be beneficial for an improved transmission of the signals and also improve the effectiveness for receiving signals. In another variation the first and the second waveguide channel branch each may comprise at least one radiating opening, wherein the at least one opening of both related branches are preferably arranged co-linear with respect to a center line. This configuration is not only beneficial for the radiation, but also for a space saving arrangement. If the second waveguide apertures are incorporated as an array of radiating openings, good results can be achieved when the radiating openings are arranged as a linear array longitudinally displaced on a broad wall of an antenna assembly.

In a preferred variation, at least one waveguide channel is, with respect to the first waveguide aperture, at a distal end interconnected to a waveguide splitter by a primary port of the splitter. The splitter is configured to split the signal in two parts and if necessary to adjust the orientation of the parts of the signal, e.g., by rotating the polarization from horizontal to vertical and/or vice-versa. The splitter routes the first part of the signal power into a first waveguide channel branch interconnected to a first secondary port of the splitter and a second part of the signal power into the second waveguide channel branch interconnected to a second secondary port of the splitter. The primary and the secondary ports of the splitter can be fully integrated into the structure of the waveguide channel and the respective waveguide channel branches and are therefore not necessarily visible from the outside. In a variation the splitter can be configured to rotate one part of the signal power clockwise and the other part counterclockwise. In a preferred variation of the antenna assembly the E-field is twisted from the horizontal direction (essentially in plane of the antenna assembly) as it arrives in the waveguide primary port to a vertical direction (essentially perpendicular to a front face of the antenna assembly) as it exits the splitter at the waveguide secondary ports.

In a variation of the splitter, the two parts of the signal power are both rotated in the same direction. Usually, the signal is split equally whereby half of the signal (power) flows into each waveguide channel branch. In the case of incoming power received by the radiating apertures, the splitter may also be configured to also work reciprocal. The splitter can therefore also function as a coupler. The received signals from both waveguide channel branches can be combined to one signal. The first waveguide channel branch and the second waveguide channel branch are preferably arranged coaxial with respect to each other at least over a certain distance. The waveguide channel of an individual antenna element is in the area of the primary port of the splitter preferably arranged perpendicular to the first and the second waveguide channel branch or parallel to the first and the second waveguide channel branch. Alternatively, or in addition, the waveguide channel of an individual antenna element can be arranged with respect to the first and the second waveguide channel branches in any angle between zero and ninety degrees. In a preferred variation at least one vertical splitter can be arranged to interconnect the first and/or second waveguide channel branch to at least one second waveguide aperture. Vertical splitters can be added to split the signal between at least two horn shaped secondary waveguide apertures.

Alternatively, or in addition, the second waveguide aperture can be horn shaped. Good results can be achieved when a flare section is arranged adjacent to the horn shaped second wave-guide aperture. The flare section is preferably arranged essentially perpendicular with respect to the waveguide splitter and/or the waveguide channel. In a variation the at least one opening can be arranged essentially parallel to the waveguide splitter and/or the waveguide channel. Known horn antennas of the prior art typically comprise a horn which is arranged coaxial with respect to the waveguide channel and/or splitter. This leads to comparatively towering constructions and therefore antenna assemblies which are comparatively thick and usually comprise several layers. To reduce the height of the antenna assembly the horn can be folded. The flare section is configured to reduce the height of the horn but still obtain the same directivity of the known horns. The folded horn has therefore the same efficiency as the known horns but with a reduced height. The folded horn further leads to antennas with a high directivity. The flare section is preferably designed as an essentially trapezoidal shaped waveguide channel. At least one of the walls of the flare section can be arranged angular with respect to the splitter. The flare angle (β) preferably starts in the horizontal plane, which allows to obtain the same efficiency as known horns but with reduced height.

Deflection elements arranged at the splitter or the waveguide channel are usually configured to introduce a 90° rotation of the E-field. The E-field which is horizontally polarized in the splitter and/or the waveguide channel is twisted such that the E-field in the flare section of the horn is vertically polarized. At least one deflection element is arranged adjacent to the first and/or second secondary port of the splitter or the horn shaped second waveguide aperture, configured to twist the E-field from the vertical polarization in the flare section to a horizontal polarization in the horn shaped second waveguide aperture. When receiving incoming signals the polarization is twisted vice versa. Alternatively, or in addition, the folded horn can comprise at least one ridge. In a preferred variation the at least one opening comprises two ridges which are arranged opposite to each other. The ridge is configured to introduce an electrical delay of the propagating mode in the central part of the waveguide, which contributes to further reduce the phase error and obtaining higher values of directivity.

Alternatively, or in addition, a ridge and or a necking can be arranged at the first and/or second waveguide channel branch configured to introduce an electrical delay of the propagating mode. The electrical delay helps to further reduce the phase error such that higher values of directivity are obtained. In case that the signal power is split in a first and in a second part, the splitter may comprise a necking, e.g., in the form of an inwardly directed protrusion or alternatively in form of a septum which is arranged in the splitter in the middle between the first and the second branch, respectively the first and the second secondary port. The necking is configured to help dividing the signal between the first and the second waveguide channel branch. Depending on the distribution to be achieved, the necking can be arranged centered between the first secondary port and the second secondary port, such that the signal is split equally between the first and the second waveguide channel branch. If appropriate, the necking can be arranged with respect to a center point between the first and second secondary port offset to one side between the first secondary port and the second secondary port, such that the signal, respectively its power, is split non-equally between the first and the second waveguide channel branch. Due to the performance advantages of the herein described arrangement, the splitting of the power is almost lossless. Only a negligible amount of power is lost during the splitting.

The polarization twist can be also achieved by a number of deflection elements which gradually alter and rotate the electric field. The deflection elements are preferably configured as impedance matching features. The at least one deflection element can be configured to twist the polarization of the E-field, such that the polarization of the first waveguide channel branch and the second waveguide channel branch are equally polarized. Alternatively, the deflection element can be configured such that the polarization of the E-field in the first waveguide channel branch and the second waveguide channel branch are reversed with respect to each other. As mentioned above, the at least one deflection element can be configured to twist the polarization of the E-field, such that the electric field is essentially twisted from the horizontal direction, to the vertical direction by 90 degrees and, if appropriate, to provide impedance matching. Alternatively, or in addition the deflection elements can be arranged asymmetrically with respect to the splitter such that an asymmetric power/phase distribution between the first and second waveguide channel branch is achieved. This can be beneficial for applications were pointing at angles different than boresight is required. At least one deflection element can be arranged at the bottom side of the first and/or second waveguide channel branch with respect to the at least one second waveguide aperture. The at least one deflection element is configured to modify the phase and power distribution of the horn elements. In a variation a number of splitters can be arranged in a cascade. A number of splitters can be arranged collinear with respect to each other between the first and second secondary waveguide channel branch and a number of horn shaped secondary waveguide apertures. In a variation where a splitter is interconnected to the first and second secondary waveguide channel branches and an additional number of splitters is arranged between the first and second secondary waveguide channel and a number of horn shaped second waveguide apertures the E-filed is twisted manifold.

Good results can be achieved when a number of splitters is arranged collinear with respect to each other between the first and second waveguide channel branch and a number of horn shaped second waveguide apertures. In a preferred variation at least one of the horn shaped second waveguide apertures can be angular offset with respect to the splitter configured to introduce a polarization twist in the respective horn shaped second waveguide aperture such that the polarization of the radiation pattern is altered. In a variation each of the splitters can comprise at least two horn shaped openings. The amplitude and phase relation between the at least two horn shaped openings of one splitter can be influenced by a deflection element. In a preferred variation the E-field of the first and the second waveguide channel branch and the amplitude/phase of both branches is equally polarized. In a variation where the splitter comprises two horn shaped second waveguide apertures, the amplitude and phase relation between the two horn shaped second waveguide apertures can be tuned by a necking and/or deflection elements arranged at the first and/or second waveguide channel branches and/or the horn shaped second waveguide aperture. Good results can be achieved when the polarization is changed from pure horizontal (0°) to slant (±45°) or vertical (90°) polarization. The polarization is preferably twisted by a series of deflection elements, such that a smooth transition is achieved. The advantage of the shown variation is that the polarization can be changed without an additional antenna layer.

In other variations the at least one deflection element, arranged inside and/or outside of the waveguide channel and/or the splitter, comprises at least one out of the group of the following elements or a combination thereof: Step, recess, channel, bump, dented corner, which usually protrude inside and/or outside the cross-section of the waveguide channel and/or the splitter forming a local reduction of the cross-section. Good results can be achieved, when the waveguide channel may comprise in the area of the primary port of the splitter two dented corners which are arranged opposite to each other and which are designed as deflection elements for the E-field. In a preferred variation, of an antenna device according to the disclosure, the length of the waveguide channel of at least one antenna element is larger than the length of the first waveguide channel branch and the length of the second waveguide channel branch combined.

In case that more directive or complex radiation patterns are required, each antenna element can comprise more than just one first and one second waveguide channel branch. Multiple columns of arrays can be arranged to the waveguide splitter and/or the waveguide channel branch. In a preferred variation at least one first column of arrays is arranged adjacent to the first waveguide channel branch and at least one second column of arrays is arranged adjacent to the second waveguide channel branch. This design is known as corporate network. The corporate network is designed in a manner such that both columns are fed with equal amplitude and phase for maximum directivity. In an alternative variation, the first and second columns of arrays are arranged as a serial feeding network. Good results can be achieved when the first and second columns of arrays are arranged adjacent to a central feeding waveguide channel. In a preferred variation the first and second columns of arrays are arranged essentially perpendicular with respect to the central feeding waveguide channel. Preferably the distal second columns are fed with a phase shift. The phase shift can create high directive and non-tilted radiation patterns.

Good results can be further achieved when the waveguide channel comprises at least a waveguide cross section out of the group of the following geometries or a combination thereof: Rectangle, rhomb, ellipse, circle, wherein a main extension direction of the cross section is essentially parallel to the first and second waveguide aperture. The first waveguide aperture and the second waveguide aperture can be laterally offset with respect to each other. This offset allows that the routing of each waveguide channel is optimized to allow impedance matching and low-loss transmission of the RF signal, to maintain a specified phase relation between the different antenna elements, and to allow a proper manufacturing process. The cross section of each waveguide channel is optimized to guarantee a high-accuracy manufacturing of the top and bottom antenna layer. One drawback of standard arrays of openings, as known from the prior art, lays in the offset position of the openings with respect to a centerline. In particular, this offset generates an asymmetric illumination of the effective antenna aperture, which in turn produces asymmetries in the radiated pattern outside of the main radiation planes (i.e., azimuth and elevation plane). These asymmetries typically result in higher radiation levels at specific undesired angles, with consequent degradation of overall system performance. In a preferred variation the first and the second waveguide channel branch of an individual antenna element can be designed in a staggered design which is configured to alter the E-field. The E-field is advantageously altered such that the at least one radiating opening of the first and the at least one radiating opening of the second wave-guide channel branch can be aligned collinear with respect to each other. The staggered design is configured to avoid an asymmetric illumination when the openings are arranged in one line. Said arrangement has the advantage of being less prone to beam-tilt and offers a wider bandwidth than the designs known form prior art. However, a MIMO antenna based on standard center-fed arrays, though, would require more than two stacked layers, since the feeding needs to be routed through the bottom of the horizontal waveguide. This would consequently result in increased manufacturing costs and complexity.

Alternatively, or in addition the waveguide channels can be at least partially replaced by a series of pillars which are based on the gap waveguide technology. In such an antenna assembly the font part, or the back part may preferably at least partially comprise pillars at least partially forming the outer contour of the waveguide channel and/or the splitter and/or the first and second waveguide channel branch. The pillars are configured to guide the signal through the waveguide channel. The pillars can be arranged to enable a bandgap structure which is configured to compensate for potential manufacturing and assembly tolerances between the front and the back part, since a direct ohmic contact is not necessarily needed between them. The electromagnetic band gap (EBG) structures are arranged essentially around the hollow waveguide channels. An electromagnetic band gap structure allows to block electromagnetic waves at a given range of frequencies, behaving as a conductive wall without the need to have direct and/or ohmic contact between the front 8 and back 7 part implementing a waveguide structure. They are usually achieved by forming periodic patterns, such as mushrooms in PCB technology or pillars in waveguide technology.

If appropriate, the at least one first waveguide aperture can be arranged in a protrusion which extends from the back face of the back part of the antenna assembly. The at least one protrusion is configured to interconnect the first waveguide aperture to the electronic component. The protrusions are especially beneficial for a variation where the electronic component is interconnected to the antenna assembly via radiating elements. In this configuration the at least one first waveguide aperture is interconnected to a protrusion via an air gap. The protrusion which protrudes from the back face of the back part is advantageously arranged congruent to a radiating element. This allows a signal transfer from the radiating element to the first waveguide aperture via the protrusion which is very efficient due to low losses.

Advantageously, at least one horizontal section of the waveguide channel may comprise a ridge configured to increase the effective surface of the waveguide. The ridge can be beneficial as it allows to lower the cross section of the waveguide. The ridge can at least be partially located adjacent to the waveguide primary port and/or the waveguide channel branches.

In view of a cost effective production, one goal is to achieve designs and techniques to implement MIMO antenna arrays that can be manufactured using only a minimum number of stacked layers (parts). The herein described disclosure offers the possibility to design antenna assemblies comprising a minimum of two stacked layers, e.g., comprising a back part and front part. The back part and the front part may be interconnected to each other along a front face of the back part and a back face of the front part. An advantageous construction can be achieved, when at least one wave-guide channel extends at least partially in the front face of the back part and/or the back face of the front part. The same applies for the splitter and/or the thereto interconnected waveguide channel branches. The front face of the back part and a back face of the front part do not have to be essentially flat. If appropriate, the front part and/or the back part can be skeletonized to reduce a contact surface. This is advantageously as the minimized contact area increases the surface pressure of the contact area and therefore results in a more accurate alignment of the front and back part in the area of the waveguide channel and/or the splitter and/or the first and second waveguide channel branches. Usually, the two parts are assembled together, wherein the channel in the front face of the back part and the channel in the back face of the front part are aligned congruently. The back part and/or the front part can be made by injection molding of at least one plastic material. Alternatively, or in addition, the back part and/or the front part can be made of metal and/or metallized plastic and/or any other material conductive at the surface. Techniques such as high-precision plastic injection molding and, if required, metallization process and metal die casting are chosen with regard to the molding parting lines and layer separations. Highly accurate molding parting lines are desired to have minimum impact on the propagation of the electromagnetic signal (i.e., minimum losses and mismatching) once the two antenna layers are joined together. In a variation, the back part and/or the front part are made of metal and/or metallized plastic and/or any other material conductive at the surface. The design of the waveguide components and the antenna layers may be optimized to be compatible with a variety of joining techniques. In a variation the front face of the back part and the back face of the front part are essentially flat. This can be particularly advantageous as preferred joining techniques may include at least one out of the group of soldering, welding, gluing (both conductive and non-conductive), clamping or a combination thereof. In a variation the back part and the front part are interconnected to each other along a front face of the back part and a back face of the front part.

The antenna assembly can comprise a fastening interface. The fastening interface of the antenna assembly is preferably designed to mount the whole antenna device to an external object, e.g., an automotive component. The antenna assembly can comprise through-holes that allow the antenna assembly to be screwed to another component. The antenna assembly is foreseen to be used in an antenna device according to the disclosure.

The antenna elements of the antenna assembly preferably fulfill the following electrical requirements:

- horizontal polarization,
- wide half power beam-width (HPBW up to ±75°) in the azimuth plane (i.e., horizontal plane, E-plane for horizontal polarization),
- narrow HPBW (down to ±3) in the elevation plane (i.e., vertical plane, H-plane for horizontal polarization),
- main beam pointing at boresight.

It is to be understood that both the foregoing general description and the following detailed description present variations, and are intended to provide an overview or framework for understanding the nature and character of the disclosure. The accompanying drawings are included to provide a further understanding, and are incorporated into and constitute a part of this specification. The drawings illustrate various variations, and together with the description serve to explain the principles and operation of the concepts disclosed.

Therefore, the applicant reserves the right to focus a divisional patent application on the inventive concept of folded splitter and horns as described throughout the present application.

The applicant further reserves the right to focus a divisional patent application on the inventive concept of the asymmetrically arranged funnel and the varying cross sections of the openings of the second waveguide aperture as well as the multiple columns of arrays.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are shows:

DETAILED DESCRIPTION OF THE INVENTION

Reference will now be made in detail to certain embodiments and variations, examples of which are illustrated in the accompanying drawings, in which some, but not all features are shown. Indeed, embodiments and variations disclosed herein may be embodied in many different forms and should not be construed as limited to the embodiments and variations set forth herein; rather, these embodiments are provided so that this disclosure will satisfy applicable legal requirements. Whenever possible, like reference numbers will be used to refer to like components or parts.

Figure 1:
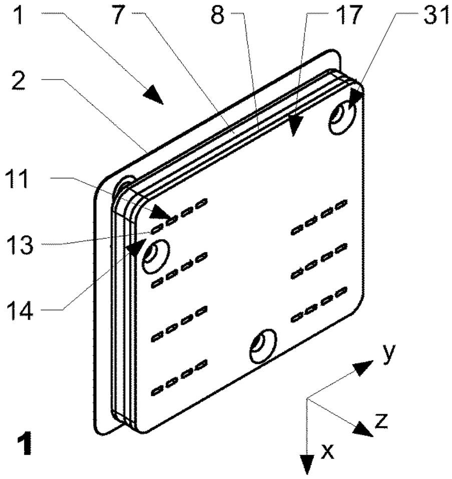
FIG. 1 shows a first variation of the antenna device according to the present disclosure in a perspective view from the front and above.
Figure 2:
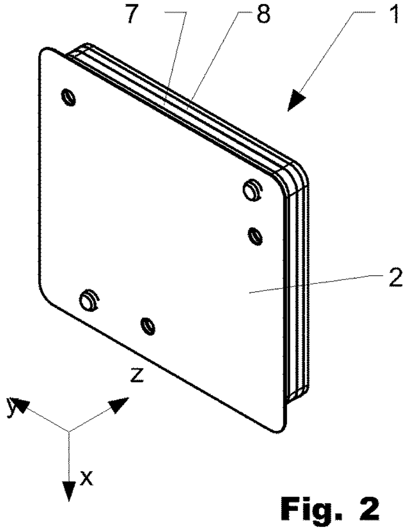
FIG. 2 shows an antenna device according to FIG. 1 in a perspective view from rear and above.
Figure 3:
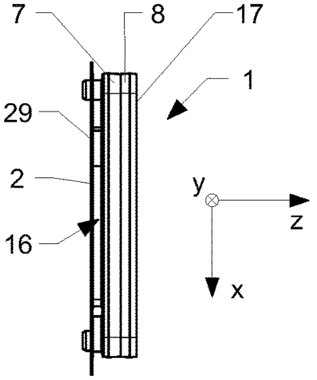
FIG. 3 shows an antenna device according to FIG. 1 in a lateral view.
Figure 4:
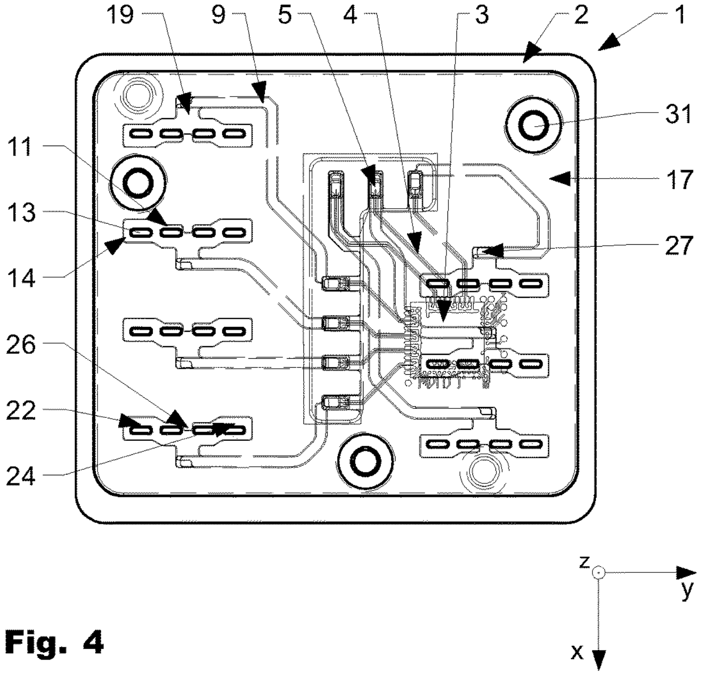
FIG. 4 shows an antenna device according to FIG. 1 in a transparent front view.
Figure 5:
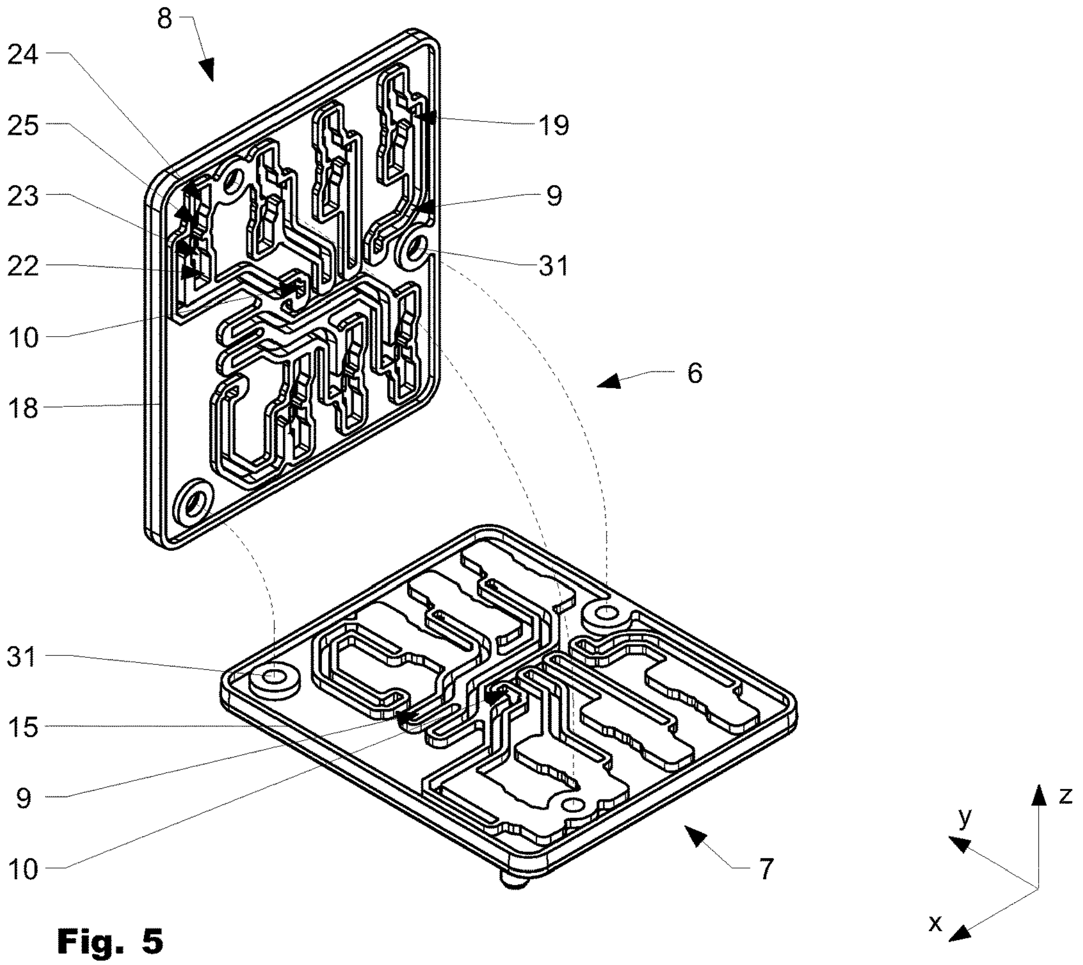
FIG. 5 shows a skeletonized variation of the antenna assembly according to FIGS. 1-4, in a perspective and exploded view from above.
Figure 6:
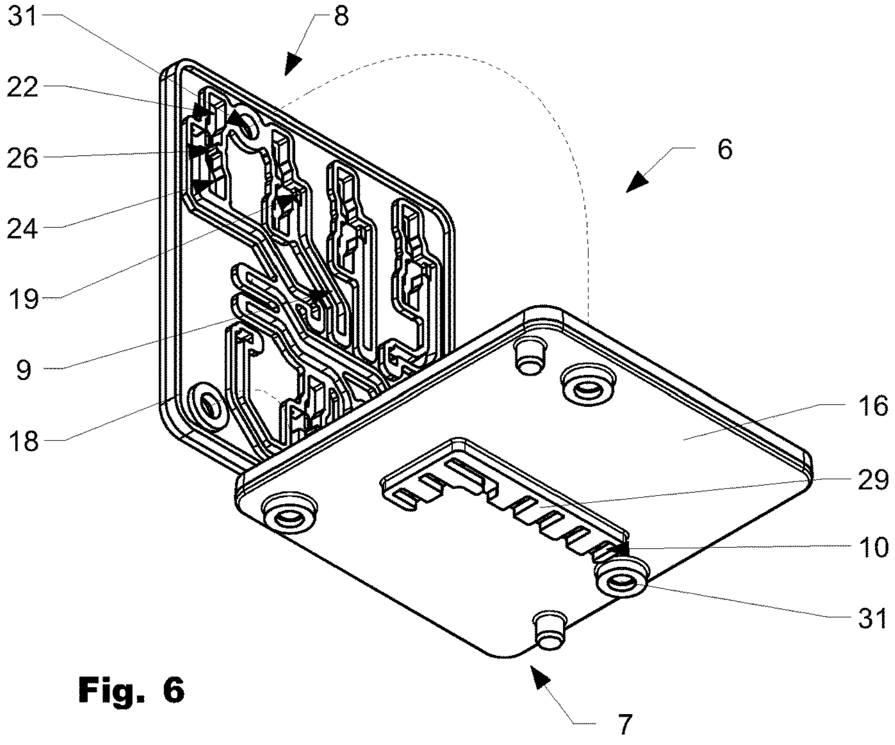
FIG. 6 shows an antenna assembly according to FIG. 5, in a perspective and exploded view from the rear.
Figure 7:
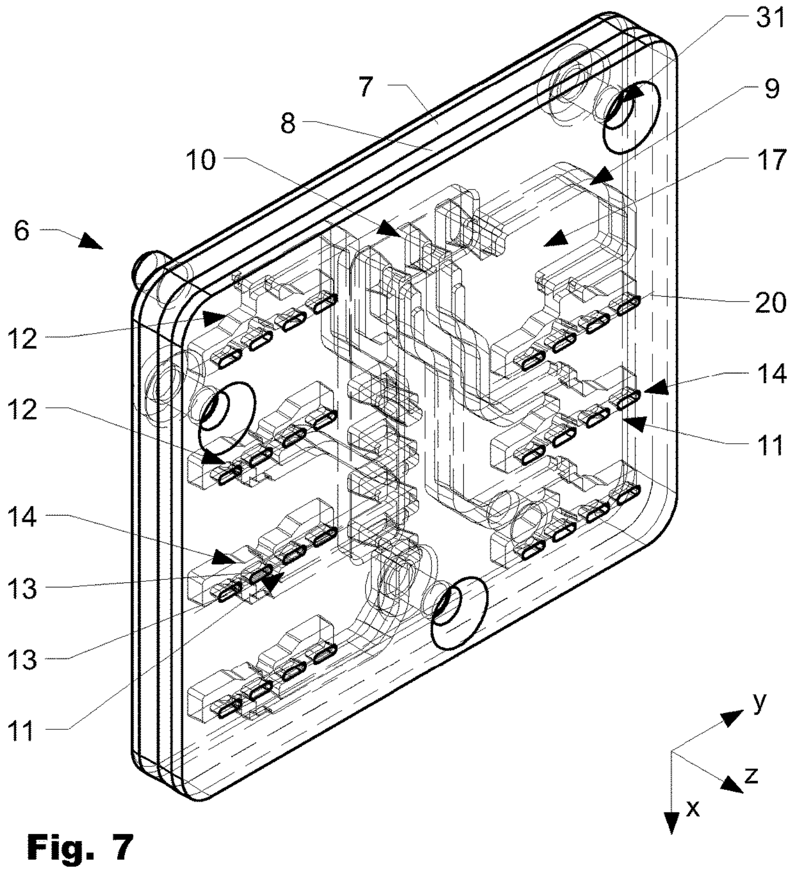
FIG. 7 shows an antenna assembly according to the disclosure in a perspective view.
Figure 8:
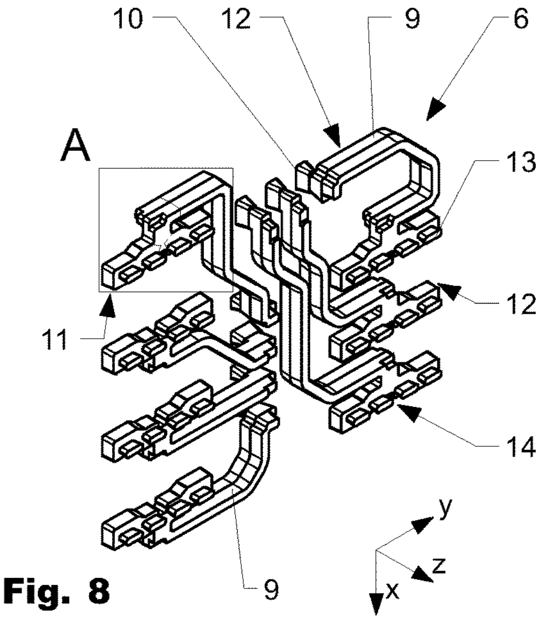
FIG. 8 shows a positive view of the waveguide channels of the antenna assembly according to FIG. 7.
Figure 9:
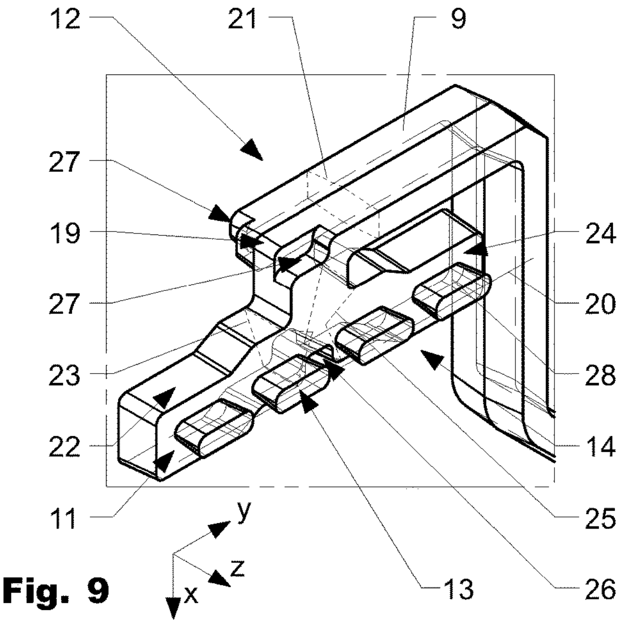
FIG. 9 show Detail A according to FIG. 8.
Figure 10:
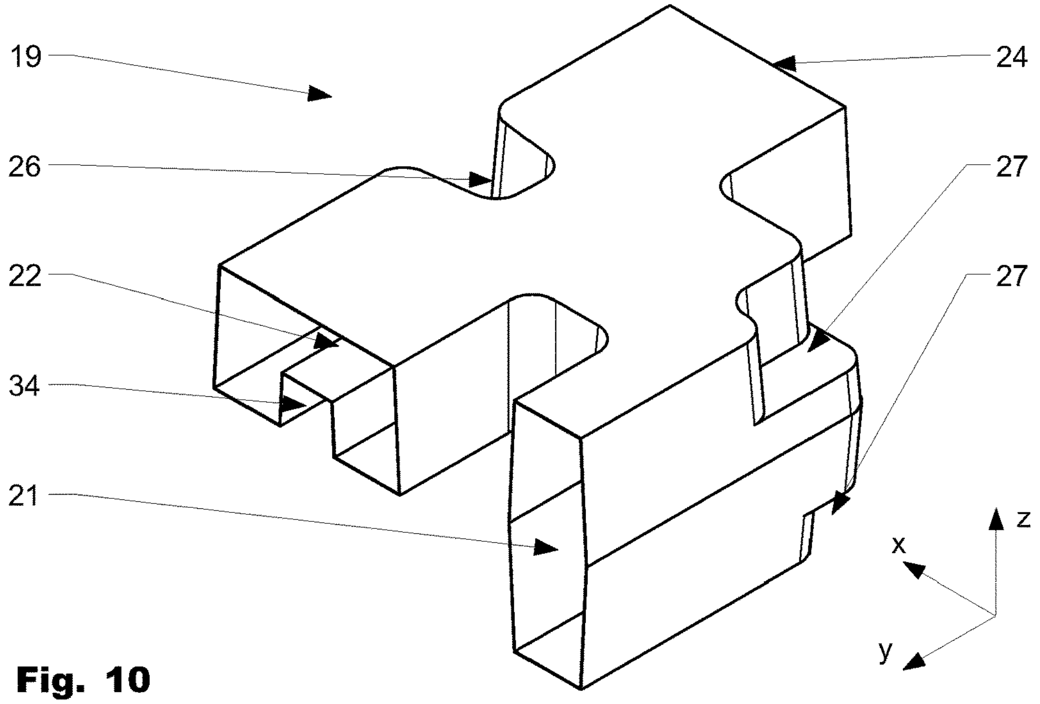
FIG. 10 shows a sectional perspective view of a first variation of the waveguide splitter from above.
Figure 11:
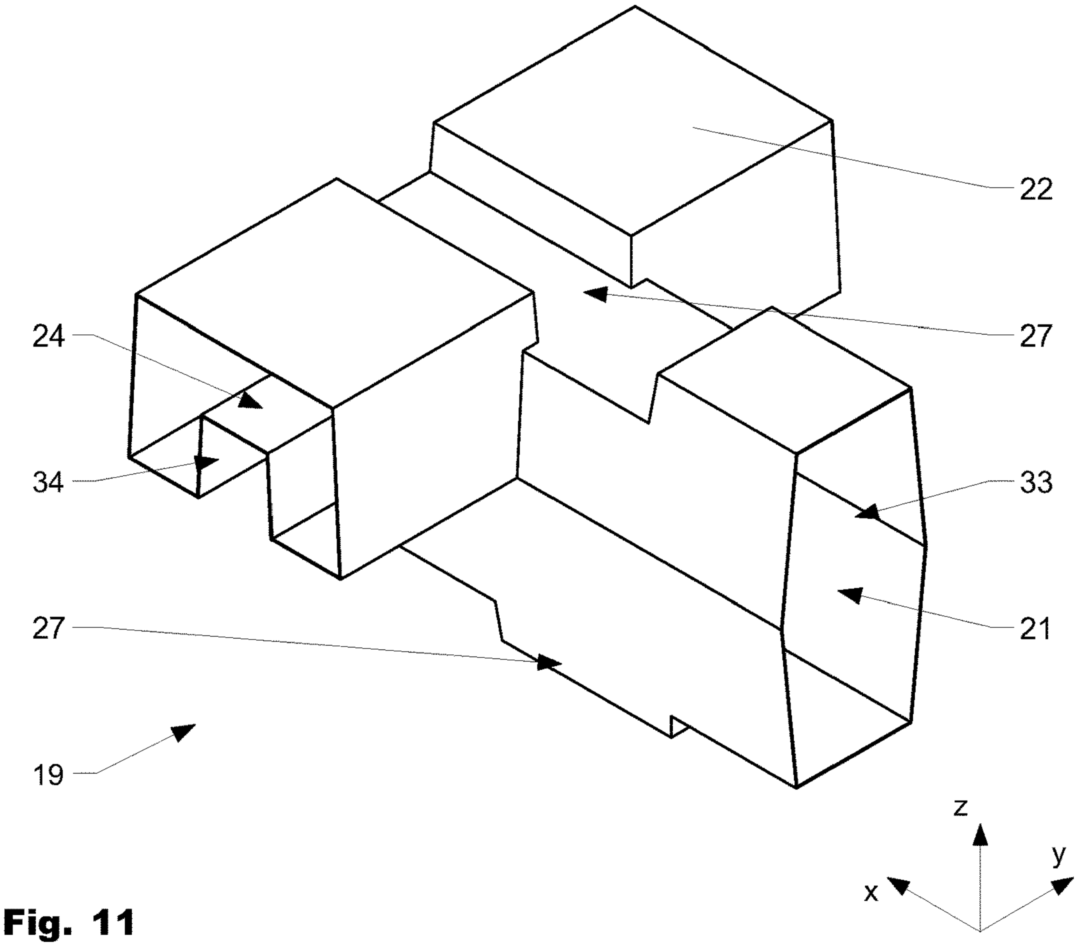
FIG. 11 shows a sectional perspective view of a second variation of the waveguide splitter from above.
Figure 12:
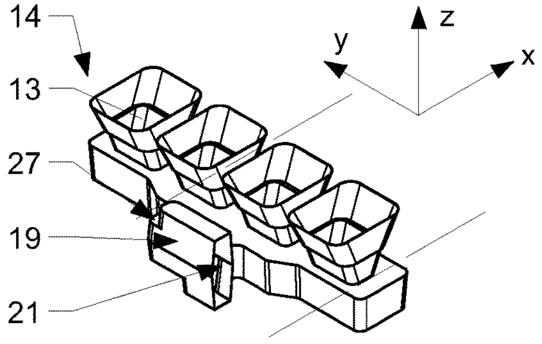
FIG. 12 shows a perspective view from above from the splitter and a first variation of the array.
Figure 13:
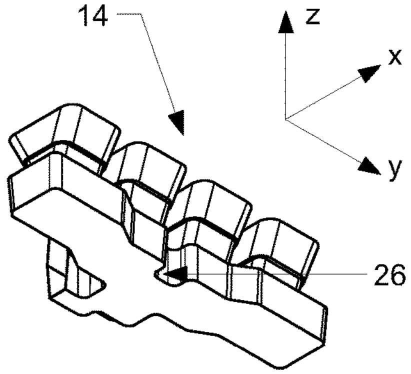
FIG. 13 shows a perspective view from the rear from the splitter and a first variation of the array.
Figure 14:
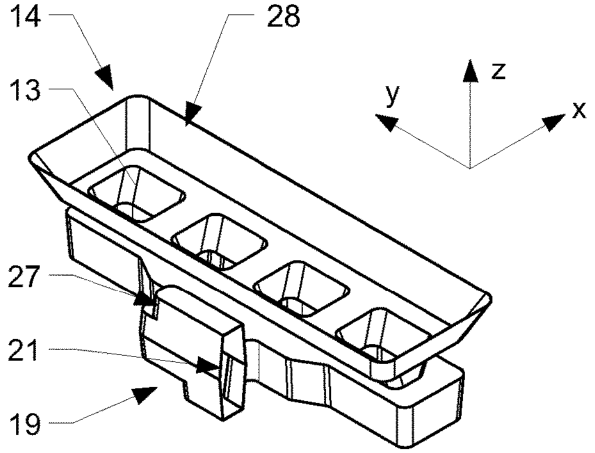
FIG. 14 shows a perspective view from above from the splitter and a second variation of the array.
Figure 15:
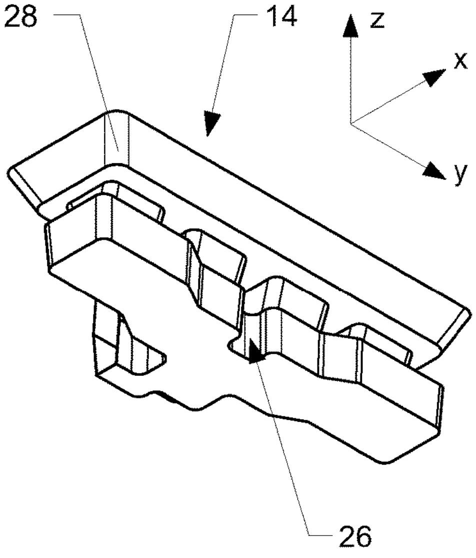
FIG. 15 shows a perspective view from the rear from the splitter and a second variation of the array.
Figure 16:
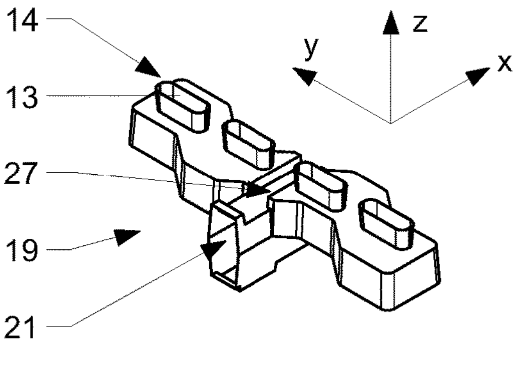
FIG. 16 shows a perspective view from above from the splitter and a third variation of the array.
Figure 17:
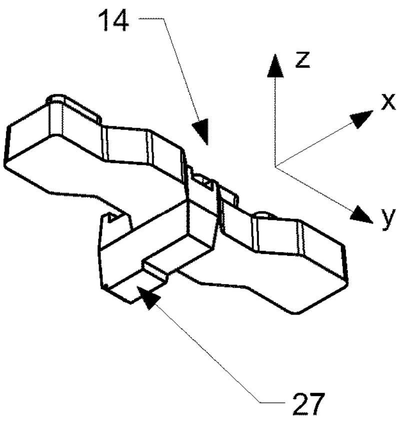
FIG. 17 shows a perspective view from the rear from the splitter and a third variation of the array.
Figure 18:
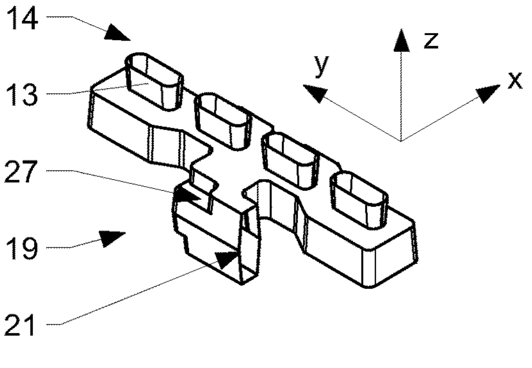
FIG. 18 shows a perspective view from above from the splitter and a fourth variation of the array.
Figure 19:
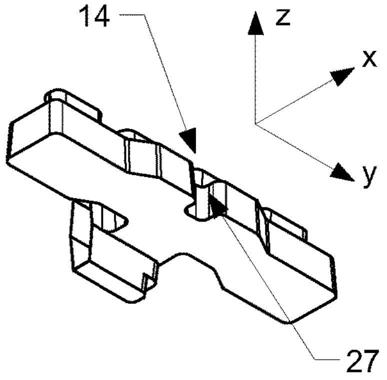
FIG. 19 shows a perspective view from the rear from the splitter and a fourth variation of the array.
Figure 20:
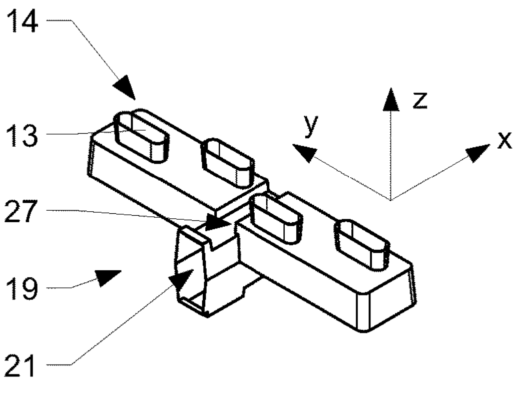
FIG. 20 shows a perspective view from above from the splitter and a fifth variation of the array.
Figure 21:
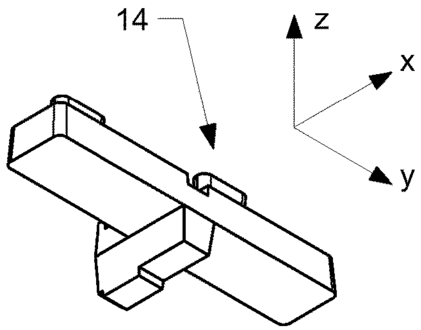
FIG. 21 shows a perspective view from the rear from the splitter and a fifth variation of the array.
Figure 22:
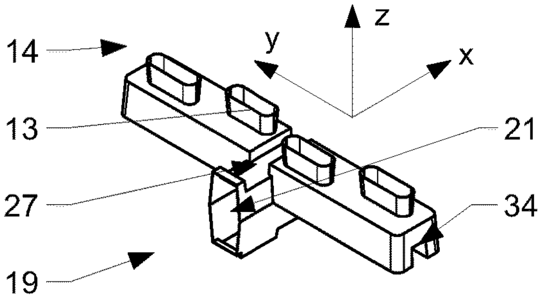
FIG. 22 shows a perspective view from above from the splitter and a sixth variation of the array.
Figure 23:
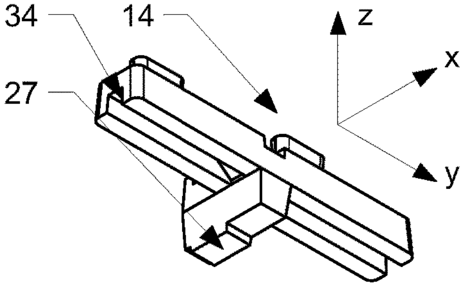
FIG. 23 shows a perspective view from the rear from the splitter and a sixth variation of the array.
Figure 24:
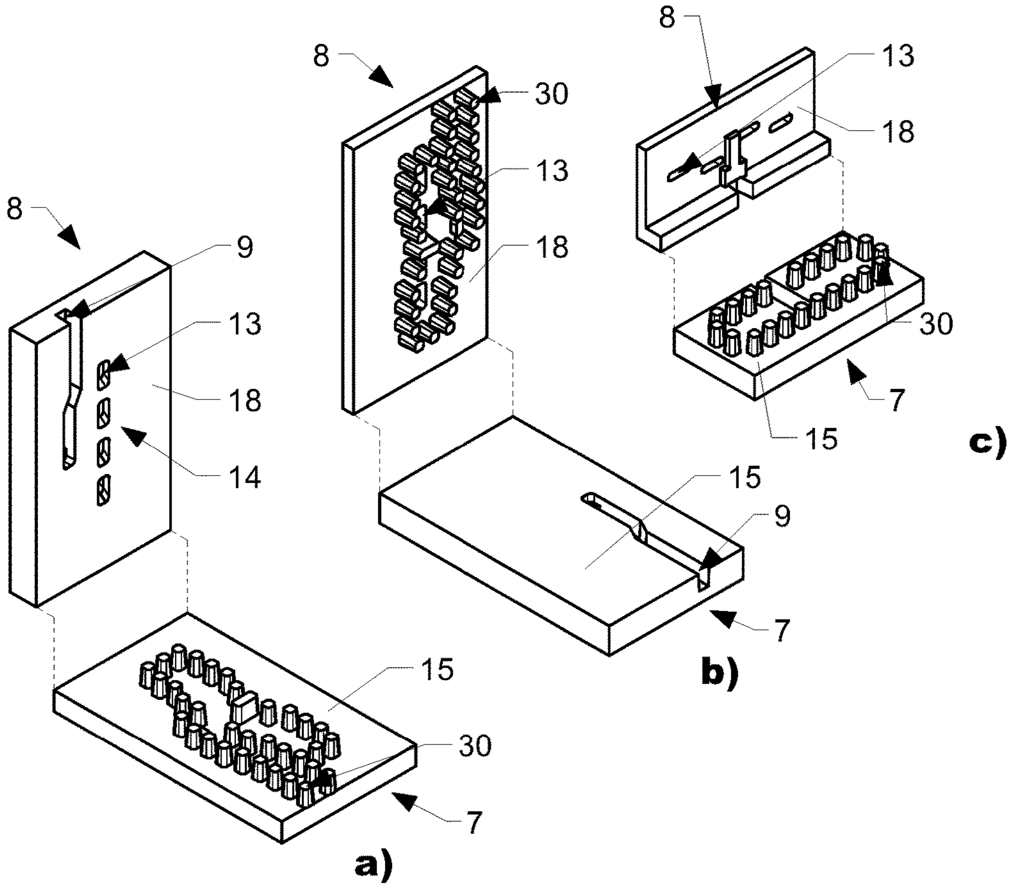
FIG. 24 shows a perspective view from above (FIG. 24 *a-c*) of a first variation of the antenna assembly with pillars.
Figure 25:
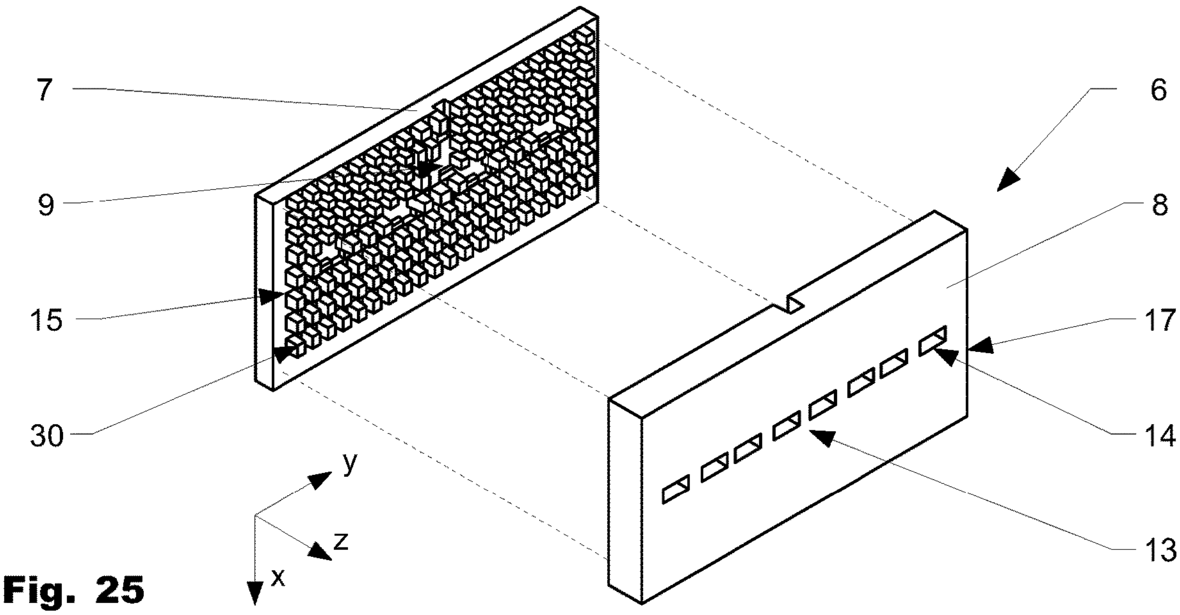
FIG. 25 shows an exploded view of a second variation of the antenna assembly with pillars shown in FIG. 24.
Figure 26:
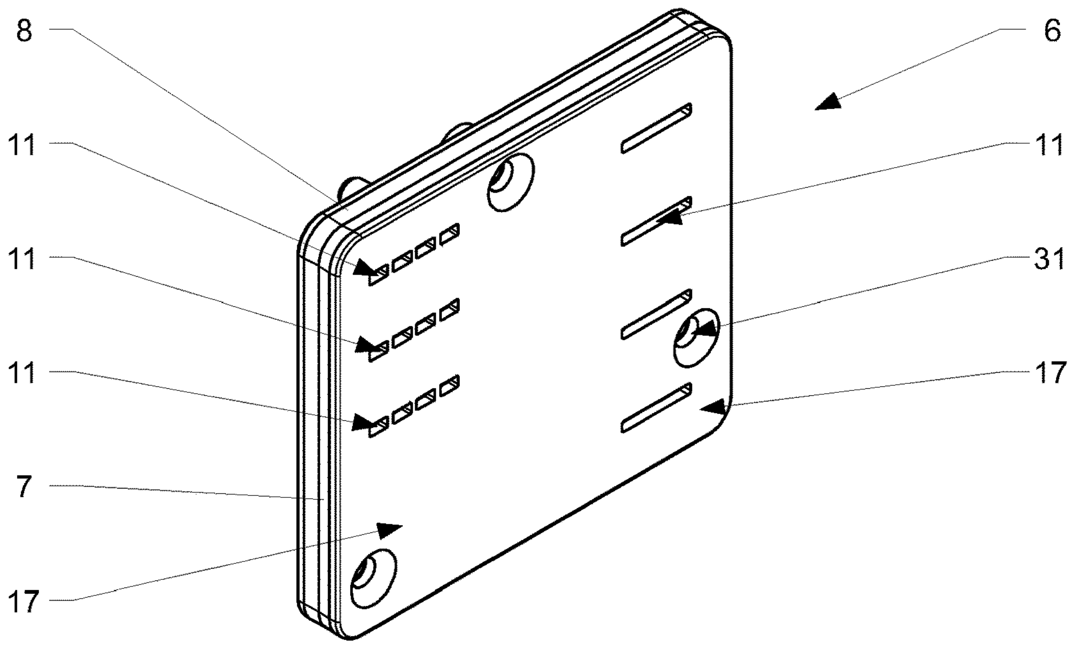
FIG. 26 shows a second variation of the antenna device according to FIG. 1 in a perspective view from the front and above.
Figure 27:
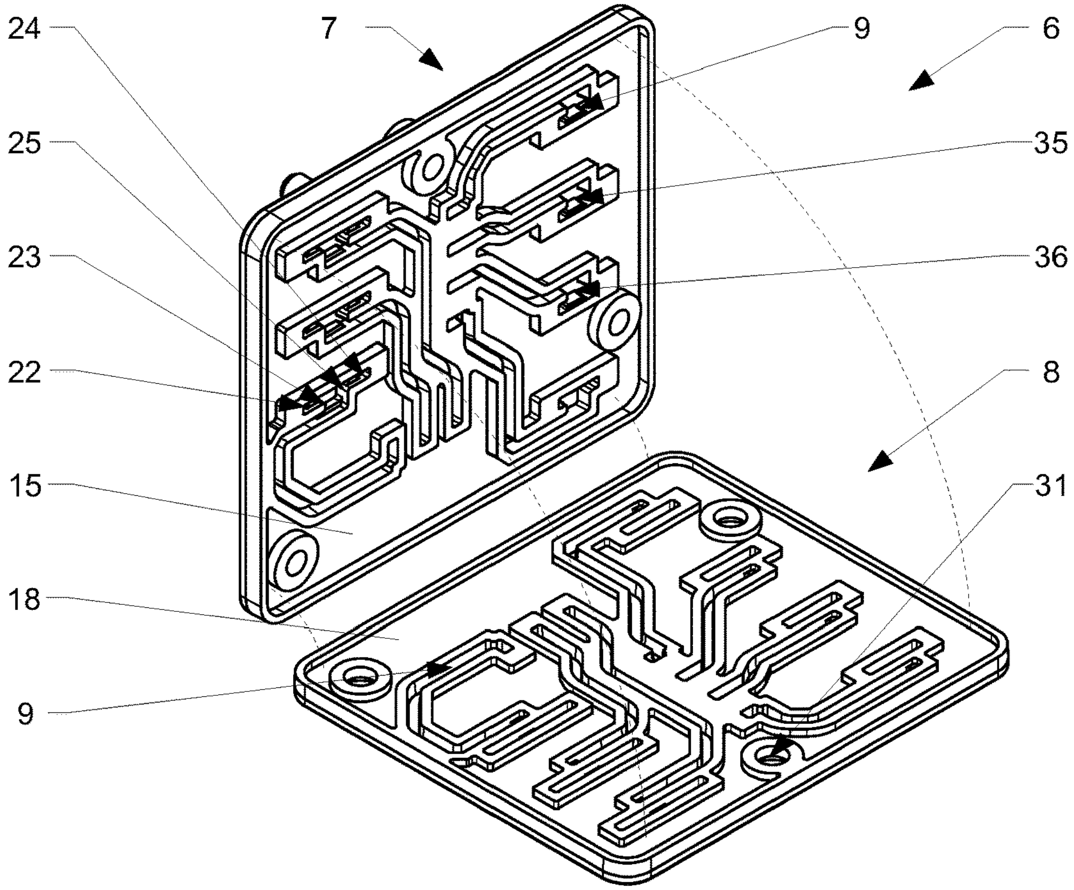
FIG. 27 shows an antenna device according to FIG. 26 in a perspective and exploded view from above.
Figure 28:
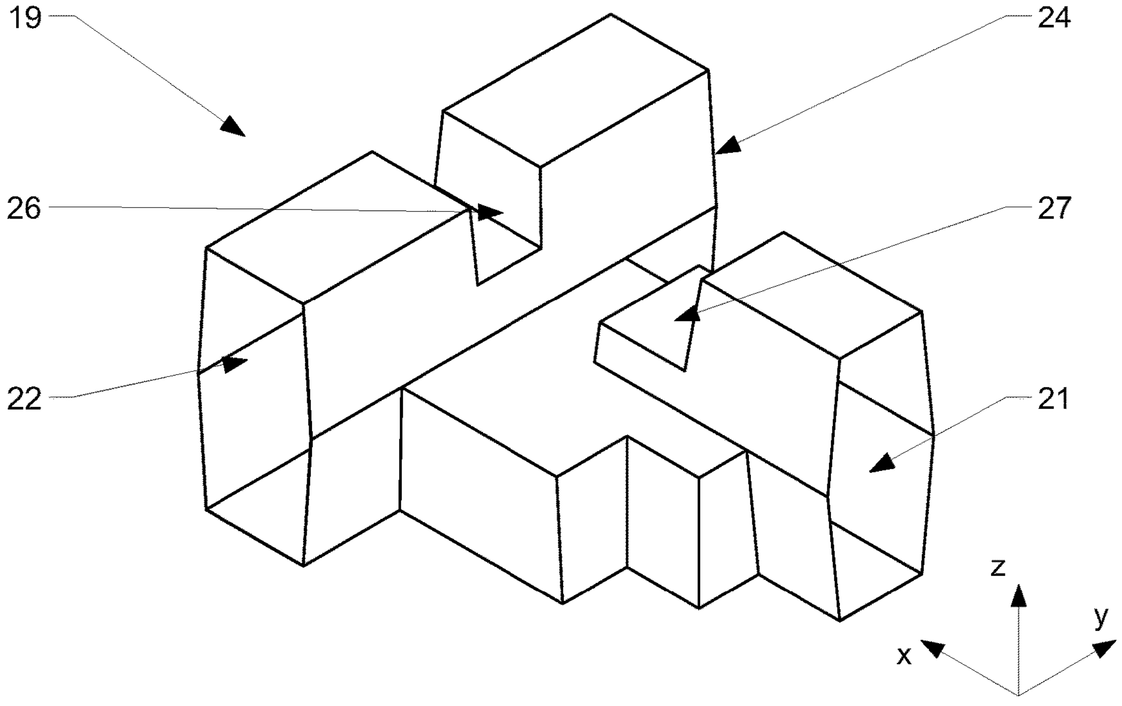
FIG. 28 shows a sectional perspective view of a third variation of the wave-guide splitter from above.
Figure 29:
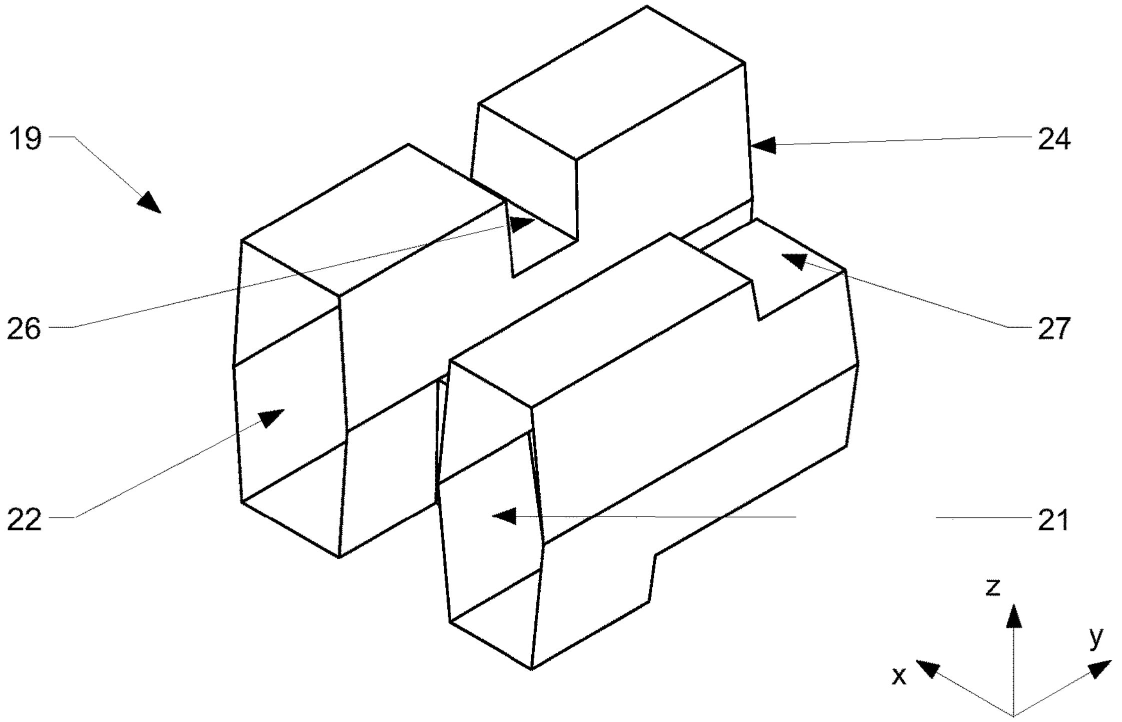
FIG. 29 shows a sectional perspective view of a fourth variation of the wave-guide splitter from above.
Figure 30:
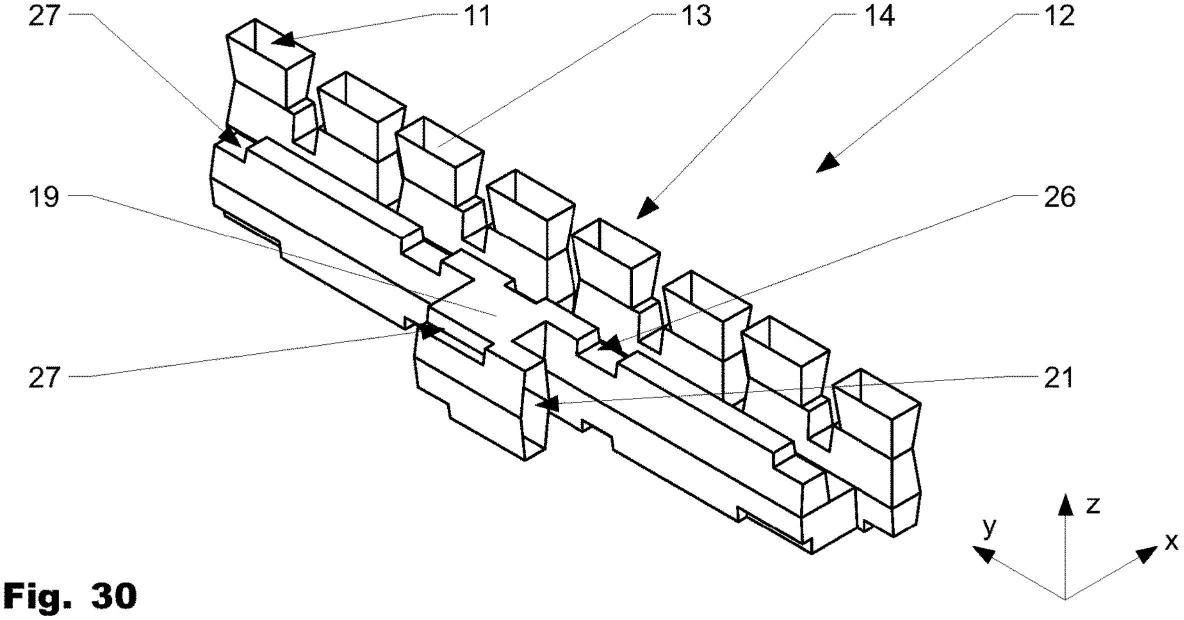
FIG. 30 shows a perspective view from the rear and above from the splitter and a seventh variation of the array.
Figure 31:
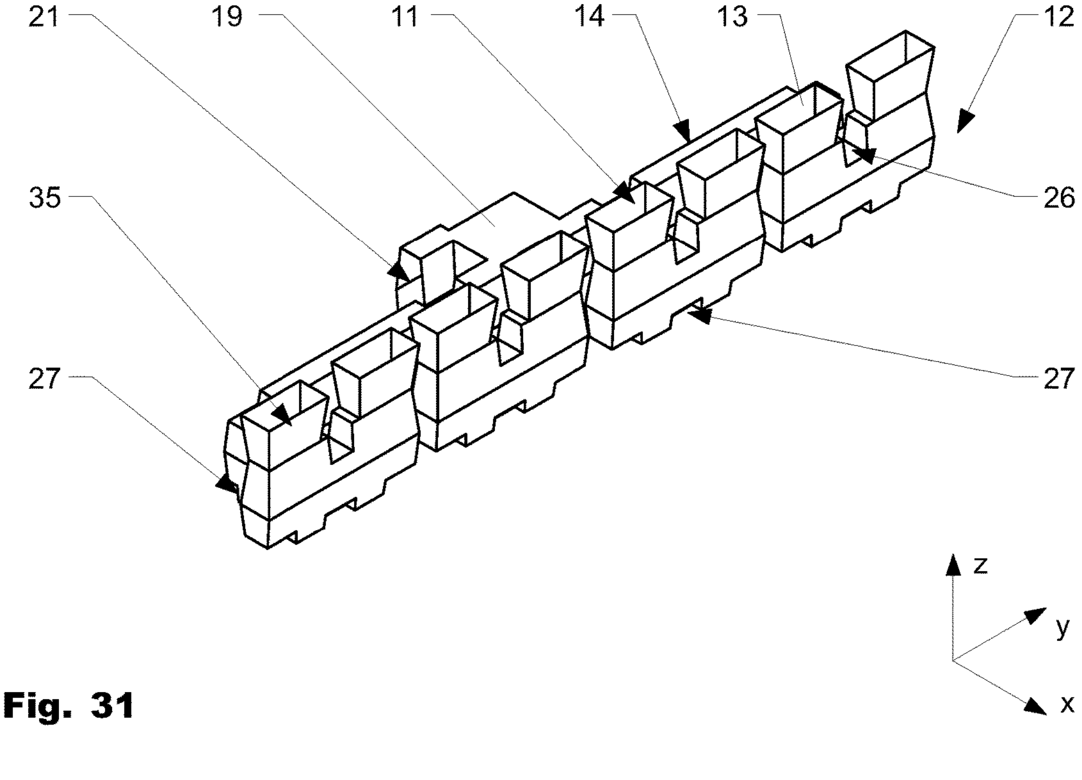
FIG. 31 shows a perspective view from the front from the splitter and a seventh variation of the array.
Figure 32:
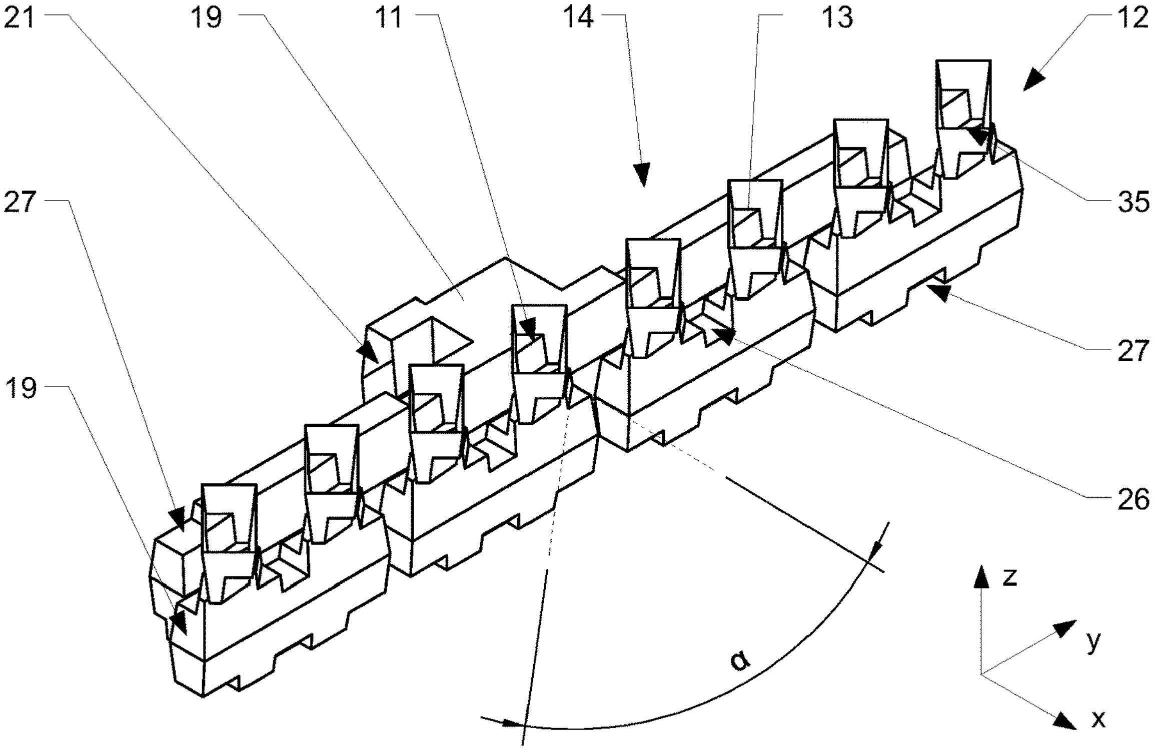
FIG. 32 shows a perspective view from the rear and above from the splitter and an eight variation of the array.
Figure 33:
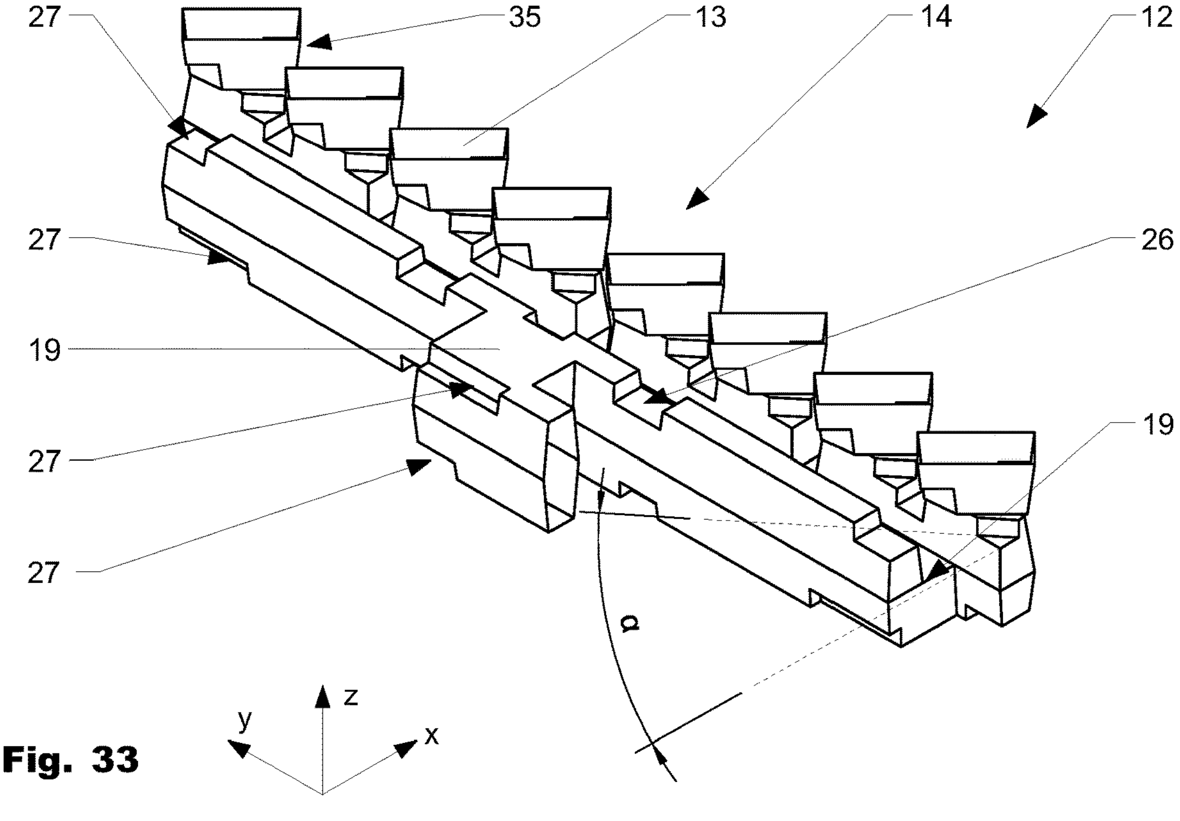
FIG. 33 shows a perspective view from the front from the splitter and an eight variation of the array.
Figure 34:
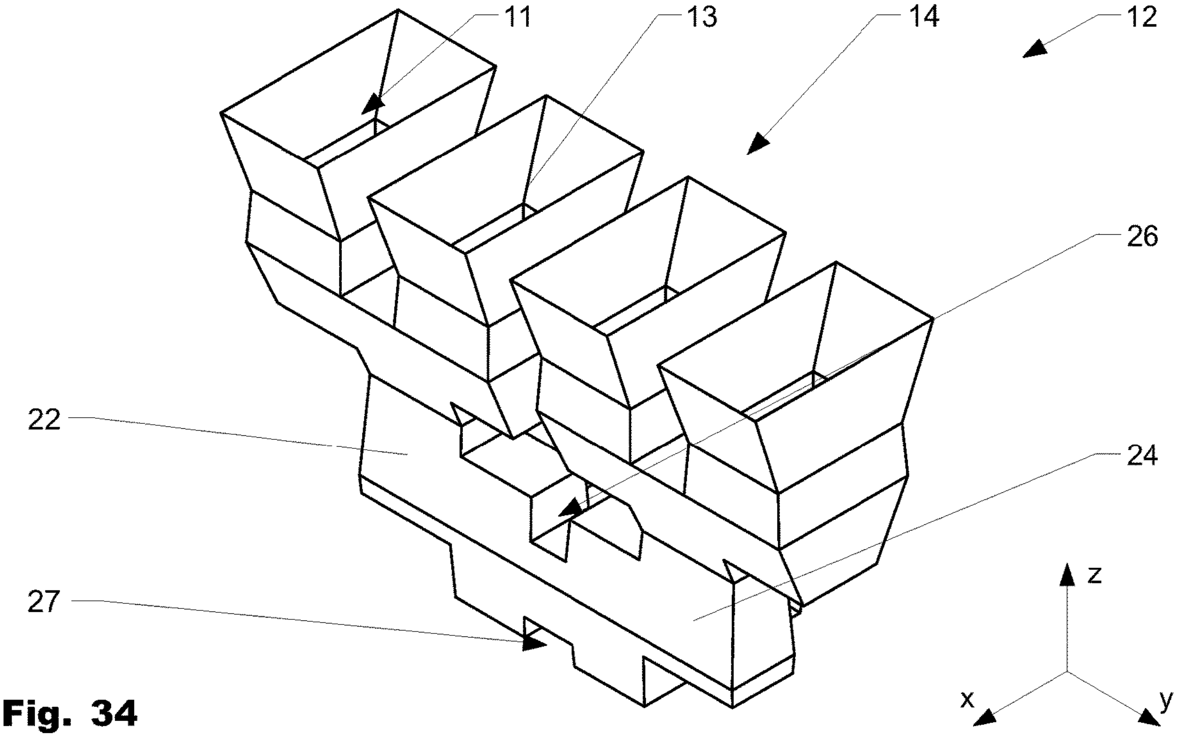
FIG. 34 shows a perspective view from the rear and above from the splitter and a ninth variation of the array.
Figure 35:
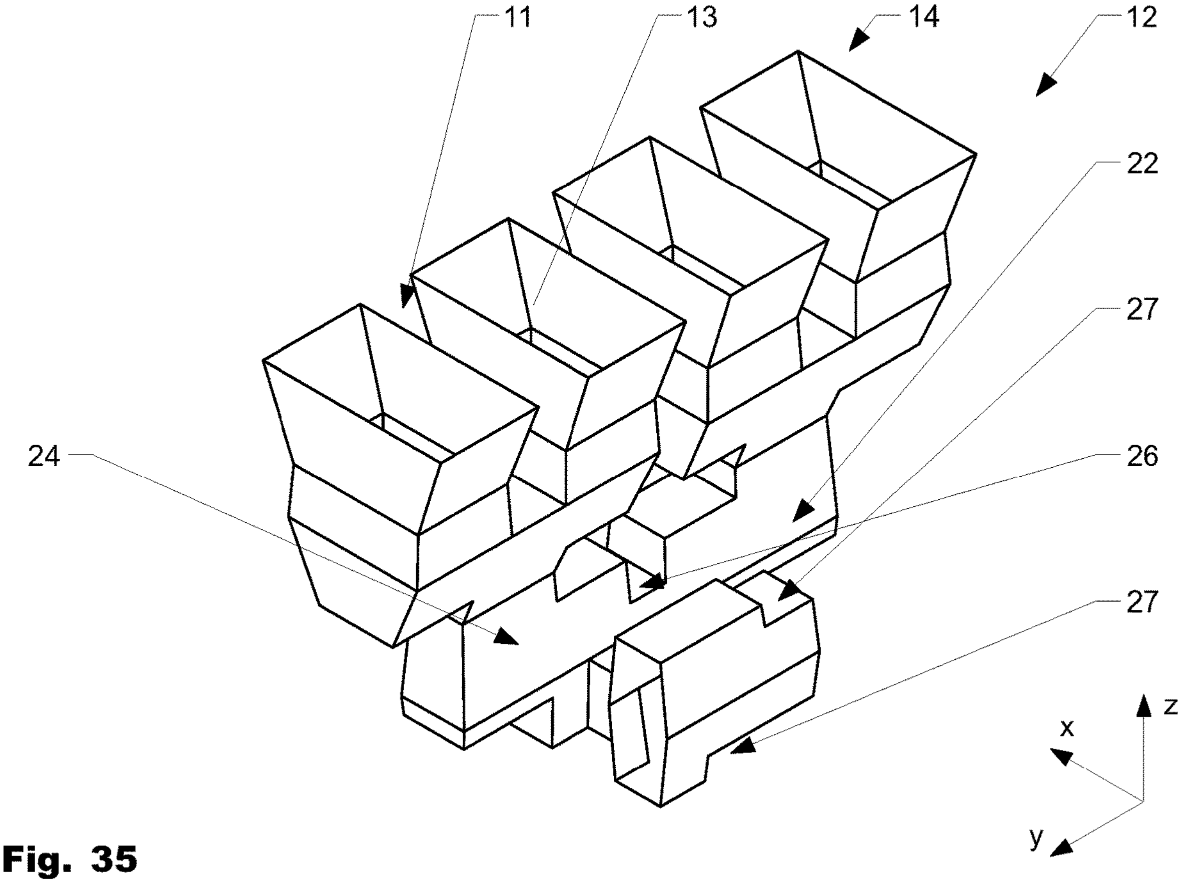
FIG. 35 shows a perspective view from the front from the splitter and a ninth variation of the array.
Figure 36:
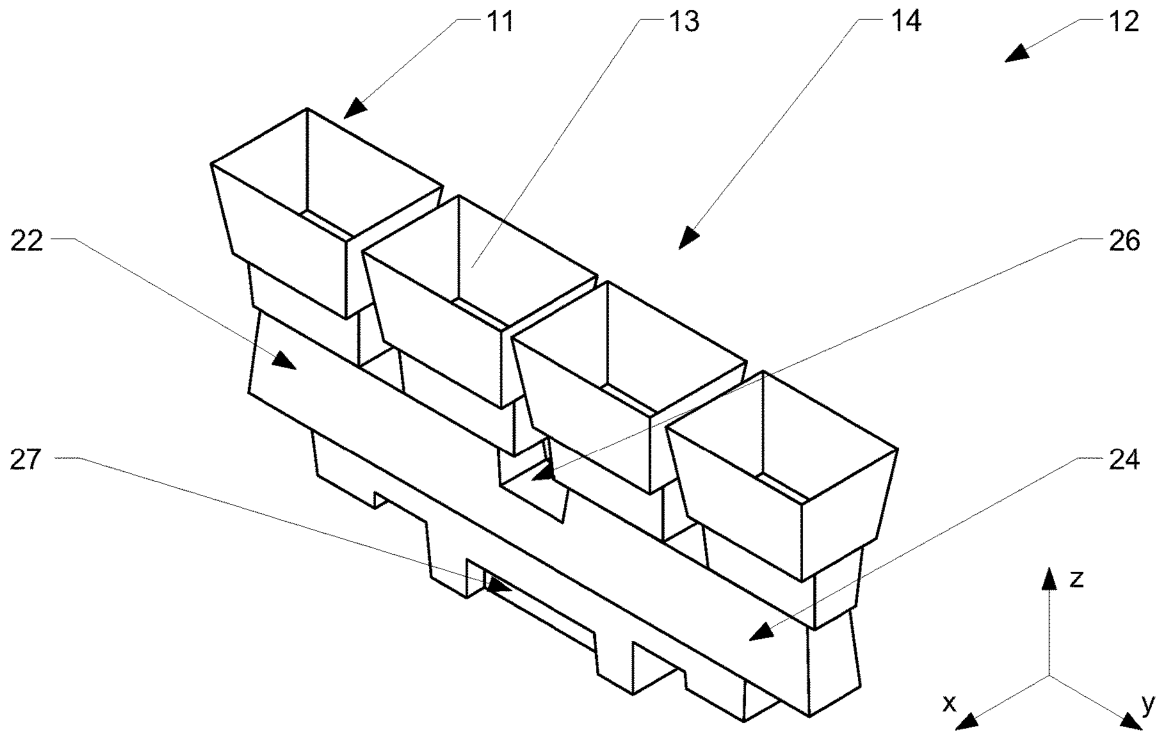
FIG. 36 shows a perspective view from the rear and above from the splitter and a tenth variation of the array.
Figure 37:
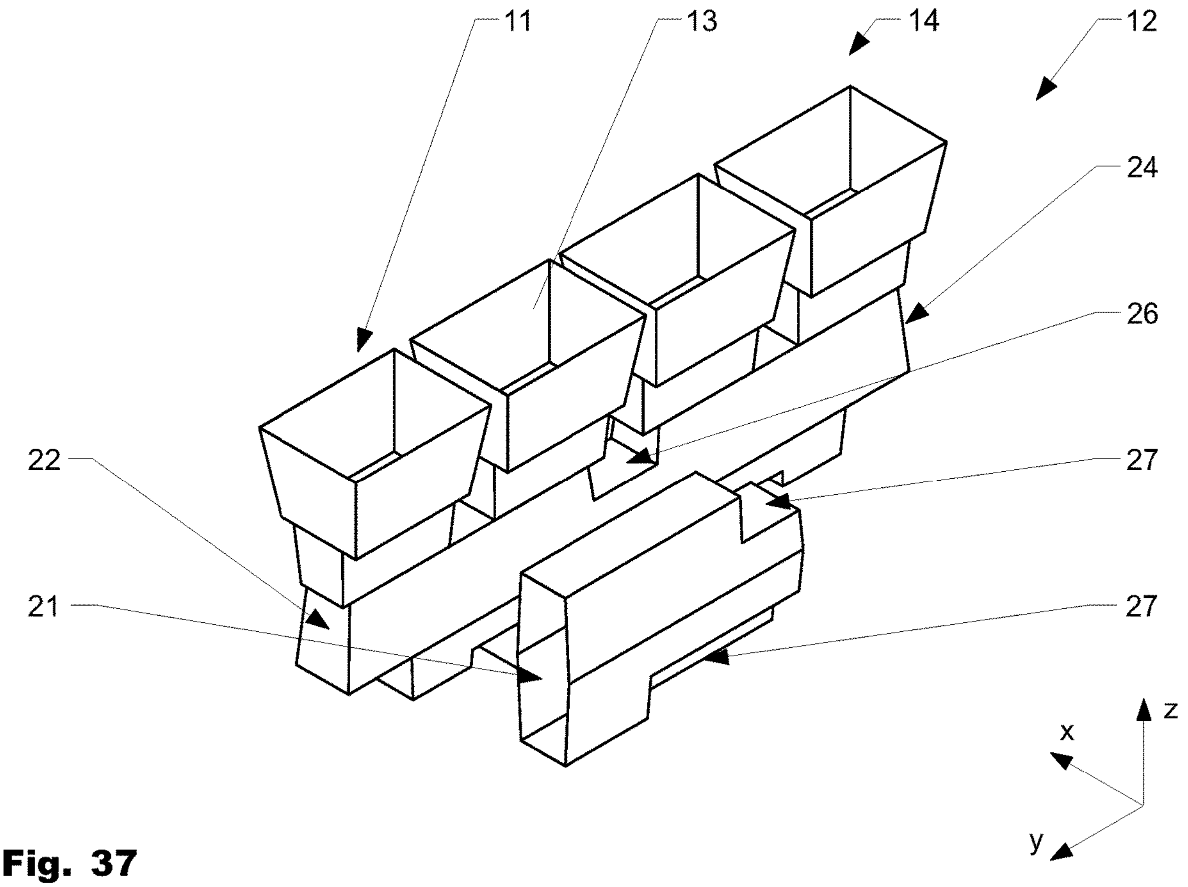
FIG. 37 shows a perspective view from the front from the splitter and a tenth variation of the array.
Figure 38:
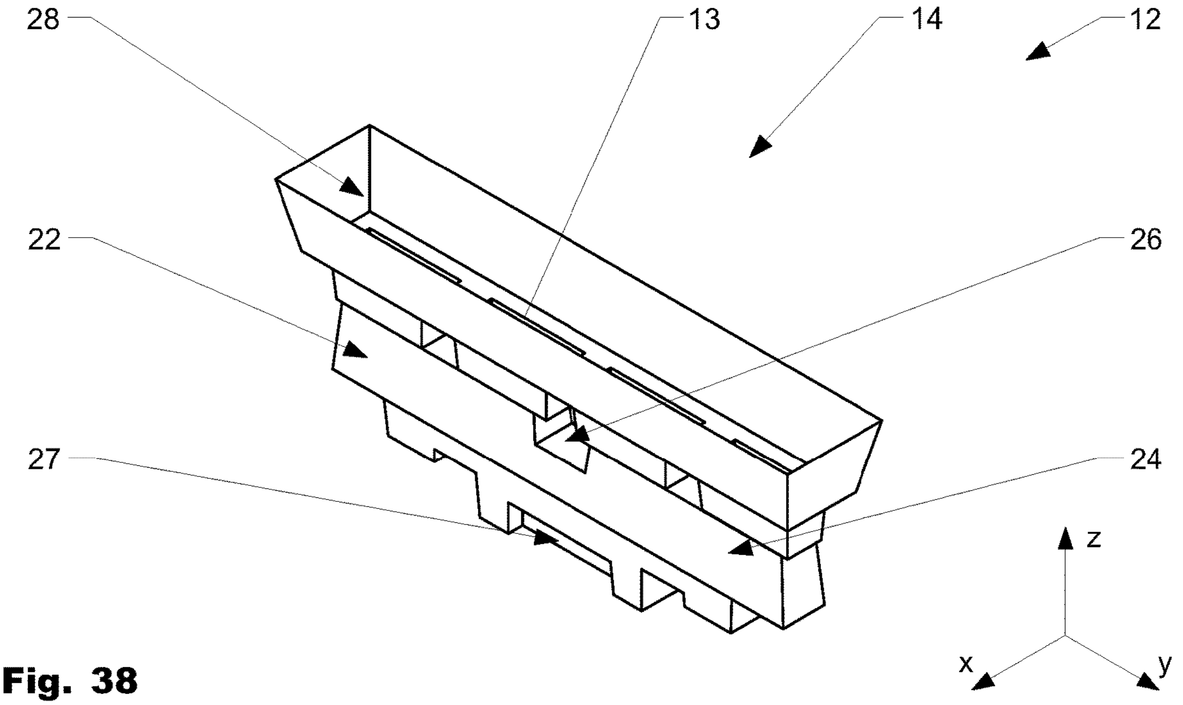
FIG. 38 shows a perspective view from the rear and above from the splitter and an eleventh variation of the array.
Figure 39:
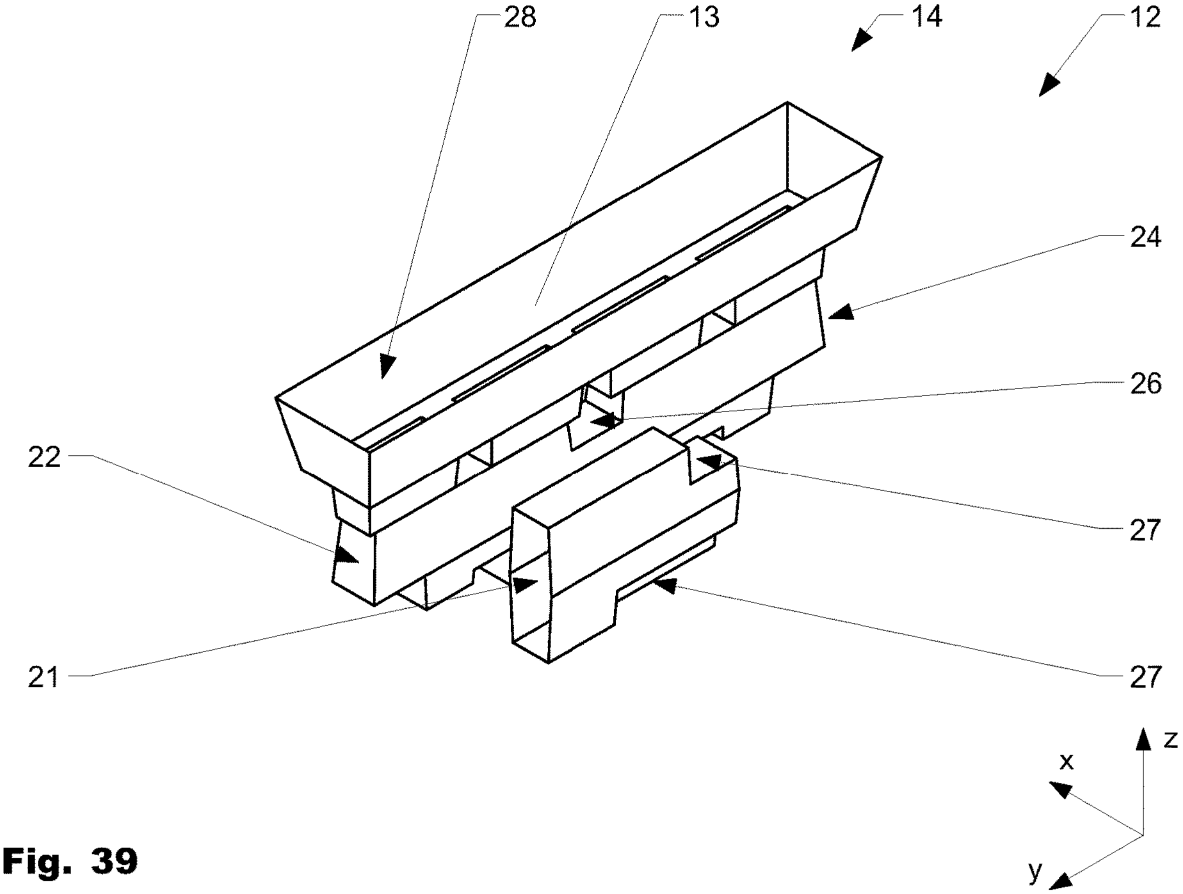
FIG. 39 shows a perspective view from the front from the splitter and an eleventh variation of the array.
Figure 40:
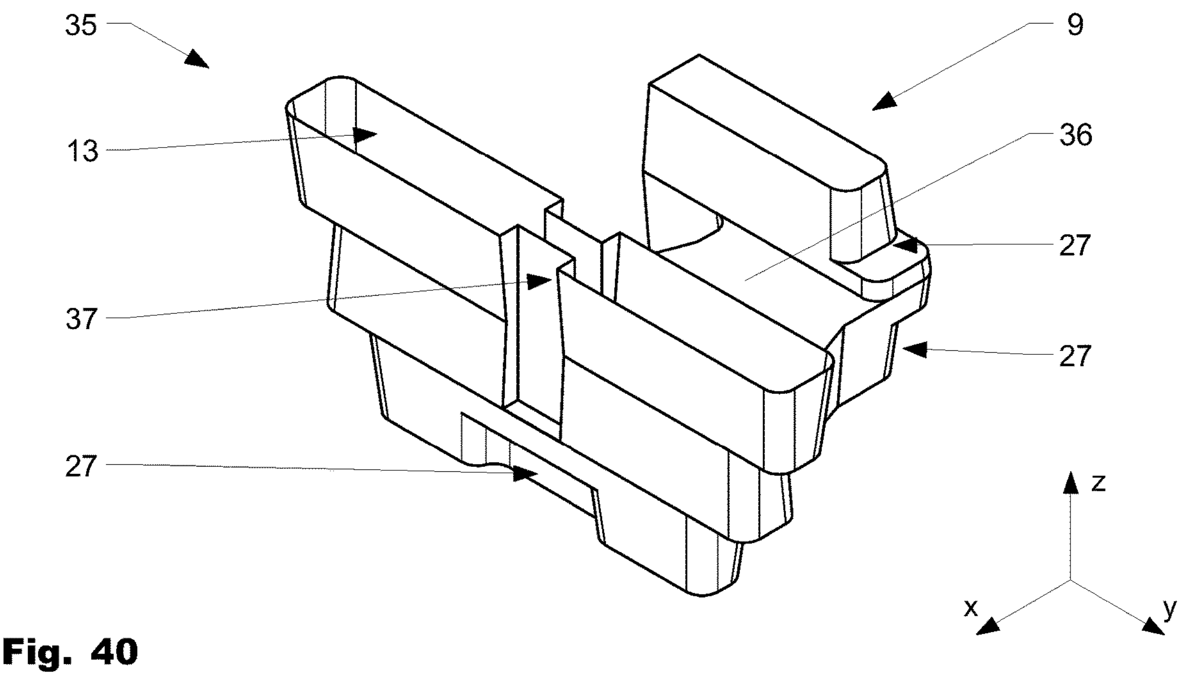
FIG. 40 shows a sectional perspective view of the distal end of the waveguide channel with thereto interconnected folded horn from the front and above.
Figure 41:
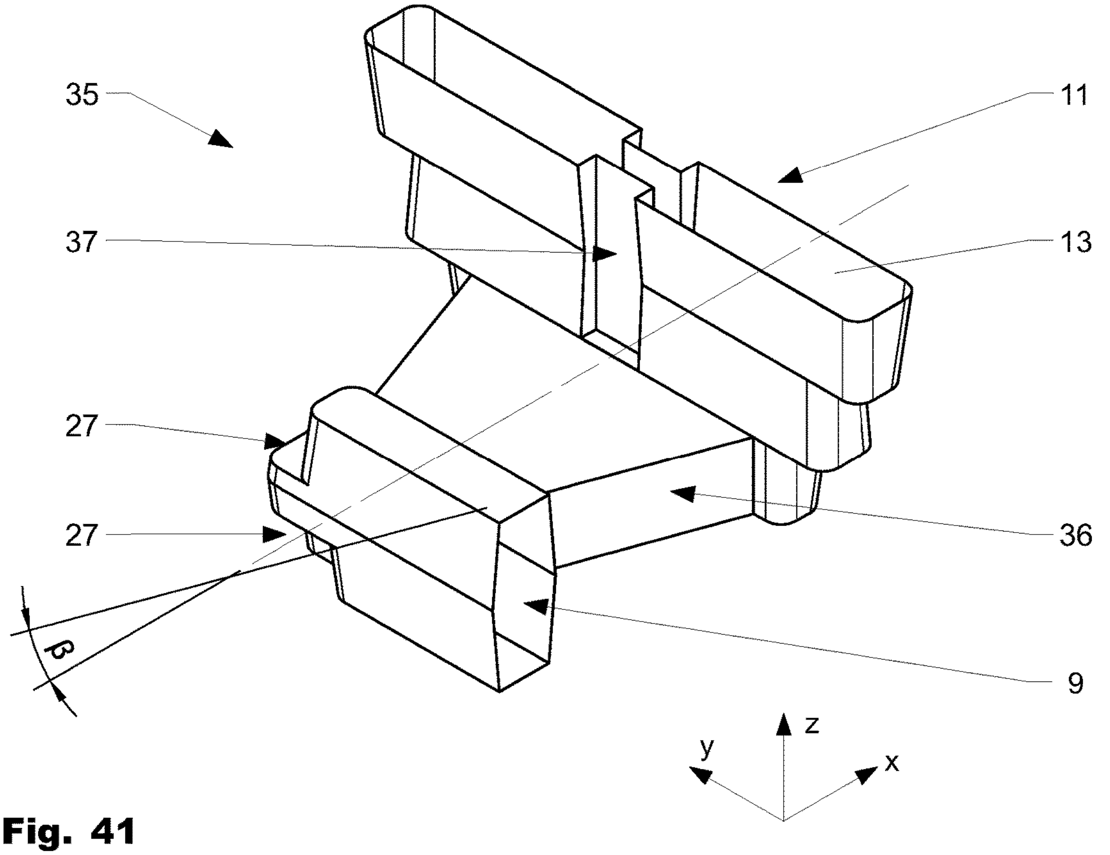
FIG. 41 shows a sectional perspective view of the distal end of the waveguide channel with thereto interconnected folded horn according to FIG. 40 from the back and above.
Figure 42:
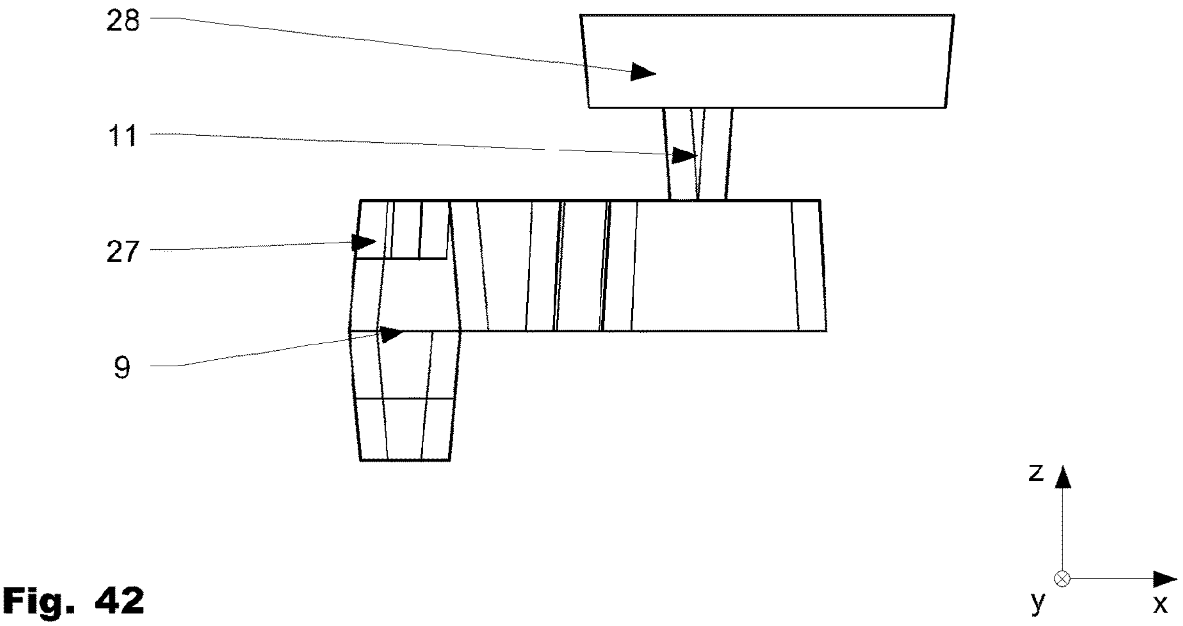
FIG. 42 shows a lateral view of the splitter and a twelfth variation of the array with an asymmetrically arranged funnel cavity.
Figure 43:
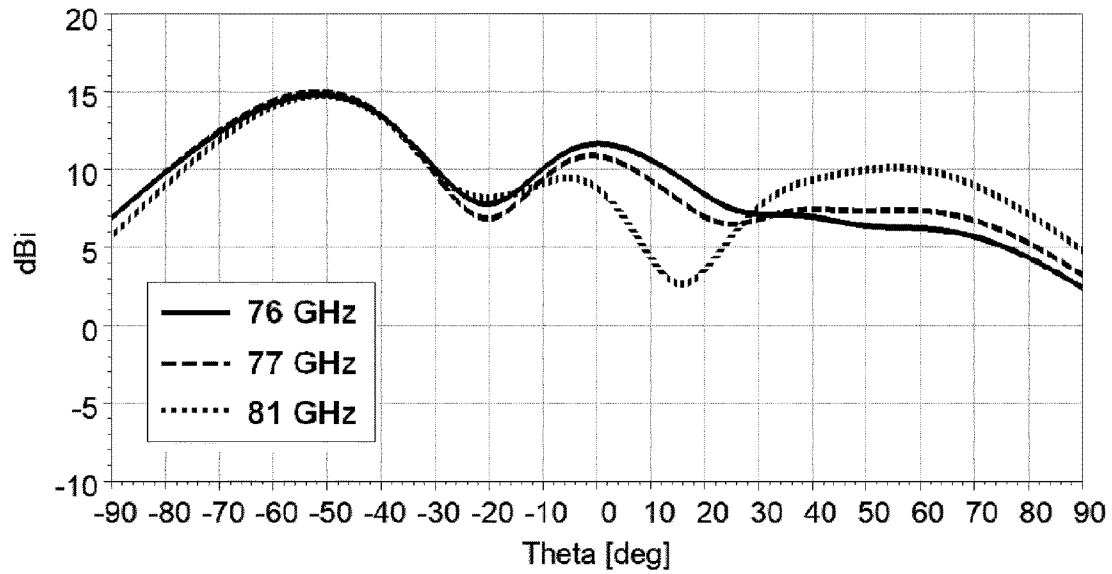
FIG. 43 shows a diagram showing the radiation pattern of the antenna device with an asymmetrically arranged funnel cavities.
Figure 44:
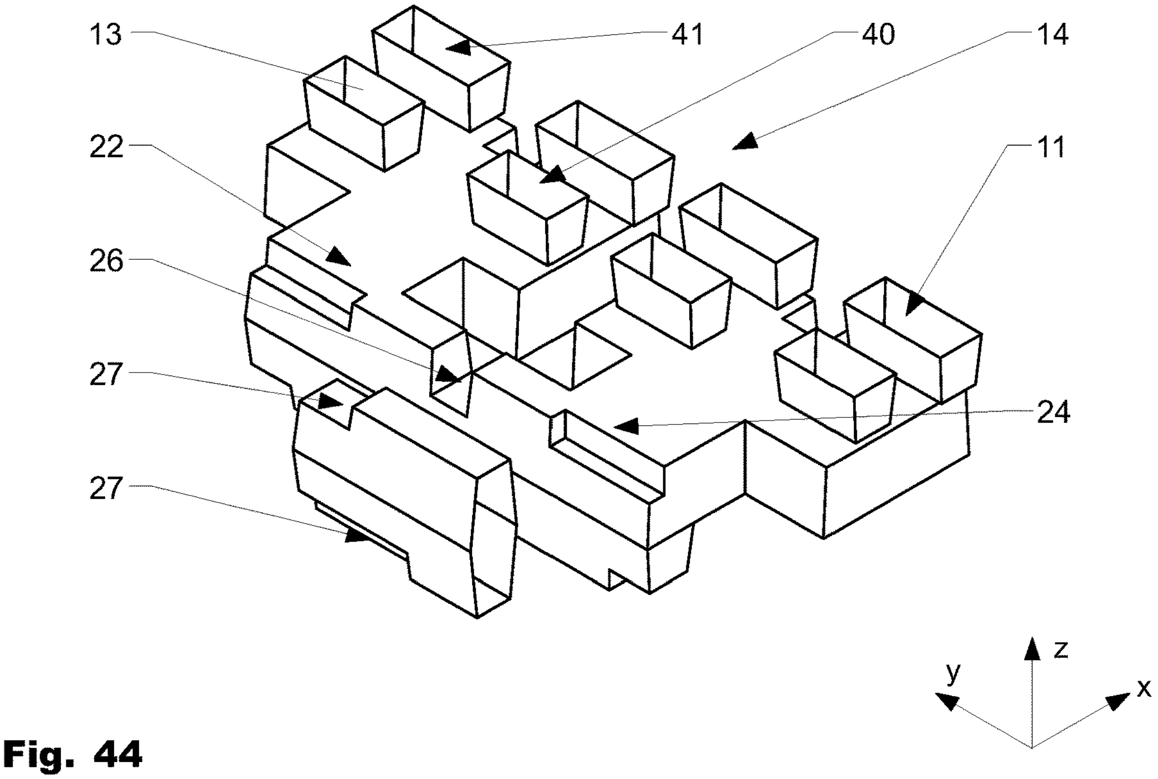
FIG. 44 shows a perspective view from the rear and above from the splitter and a thirteenth variation of the array.
Figure 45:
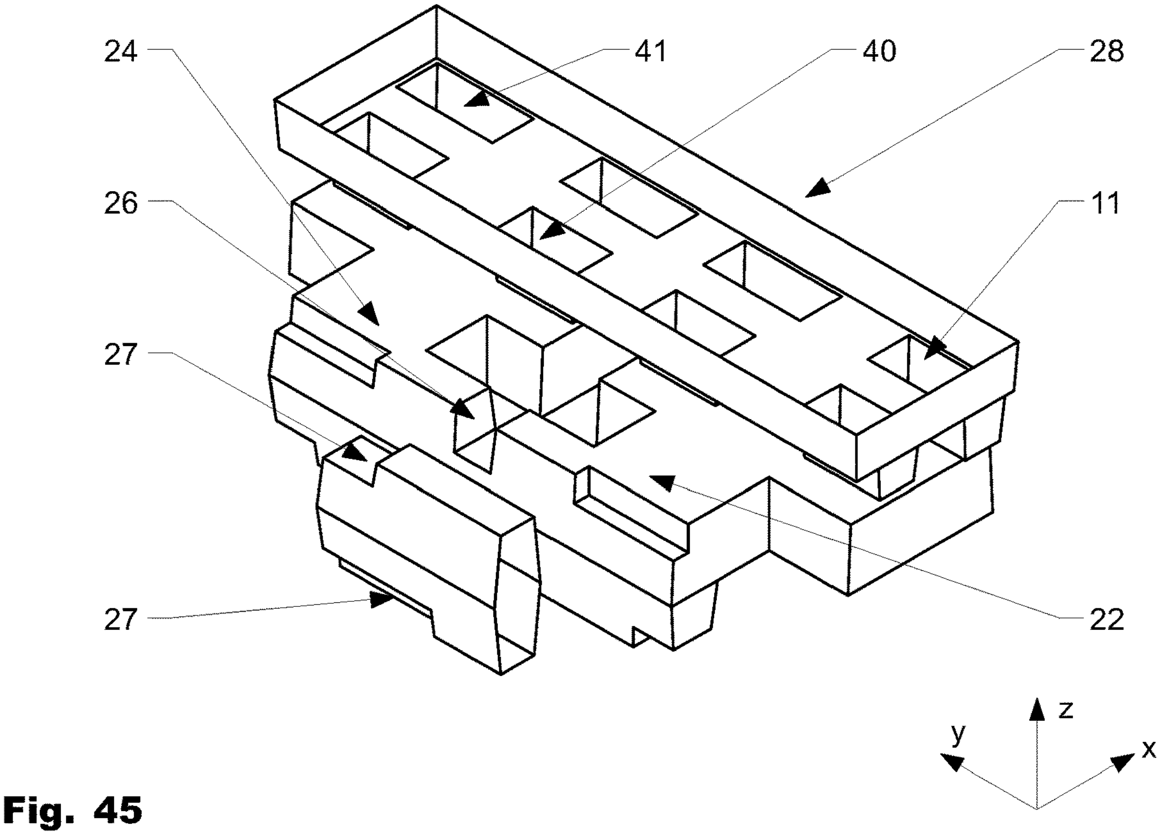
FIG. 45 shows a perspective view from the rear and above from the splitter and a fourteenth variation of the array a funnel cavity.
Figure 46:
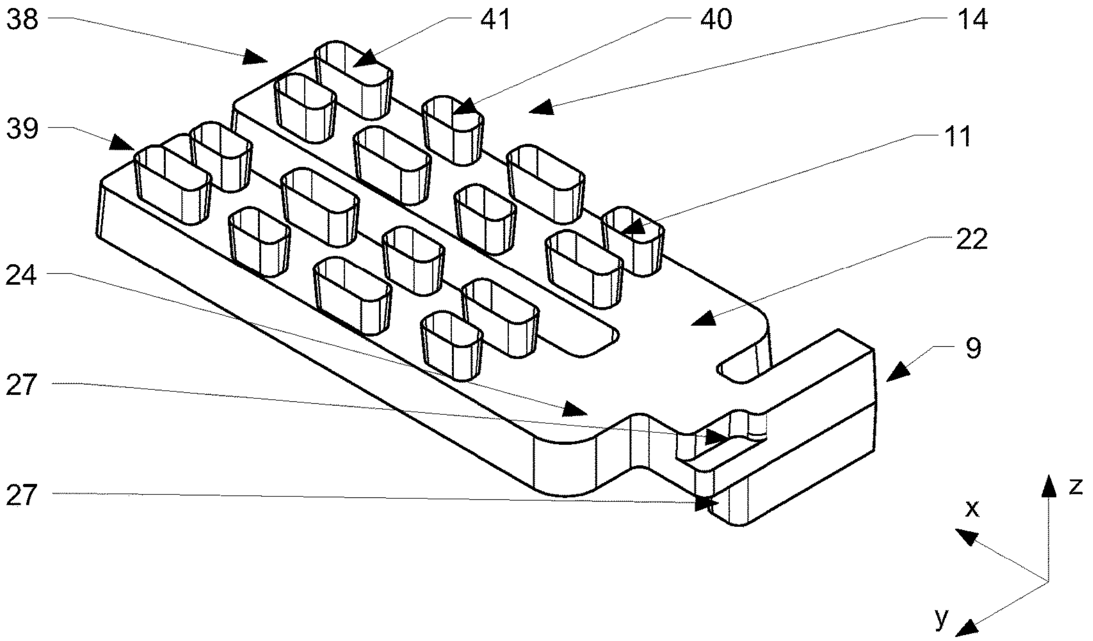
FIG. 46 shows a perspective view from the rear and above from the splitter and a fifteenth variation of the array designed as multiple branch arrays.
Figure 47:
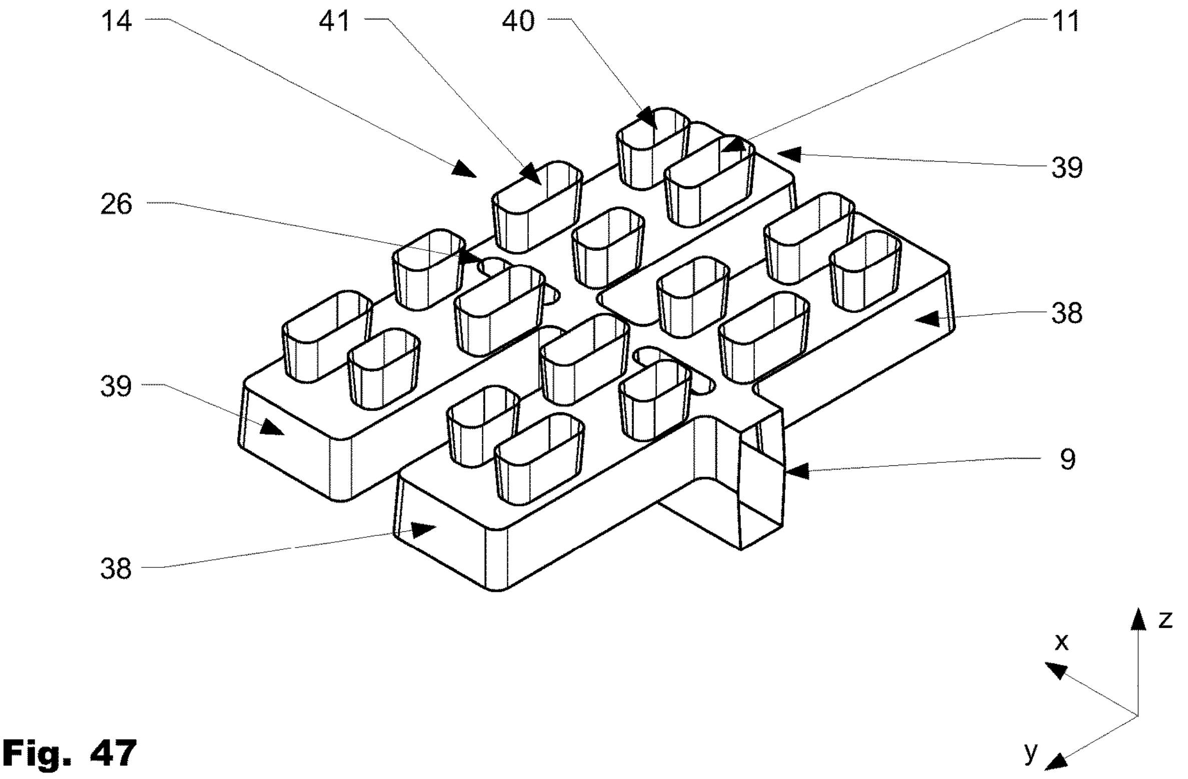
FIG. 47 shows a perspective view from the rear and above from the splitter and a sixteenth variation of the array designed as multiple branch arrays.

FIG. 1 shows a first variation of the antenna device 1 according to the present disclosure in a perspective view from the front and above. FIG. 2 shows the antenna device 1 according to FIG. 1 in a perspective view from the rear and above. FIG. 3 shows the antenna device 1 according to FIG. 1 in a lateral view. FIG. 4 shows the antenna device 1 according to FIG. 1 in a front view, wherein the hidden lines are shown to provide information on the inside. FIG. 5 shows an alternative skeletonized variation of the antenna assembly according to FIGS. 1-4, in a perspective and exploded view from above FIG. 6 shows the antenna device 1 according to FIG. 1 in an exploded perspective view from the rear and above. FIG. 7 shows an antenna assembly 6 according to the present disclosure in a perspective view from the front and above. FIG. 8 shows in a perspective view a positive of usually air filled waveguide channels 9 arranged inside of the antenna assembly 6 according to FIG. 7. FIG. 8 shows a positive of the waveguide channels 9 according to FIG. 7. FIG. 9 shows section A of FIG. 8. FIG. 10 shows a sectional perspective of a first variation of the waveguide splitter 19 wherein the waveguide channel 9 of the shown variation is in the area of the primary port 21 of the splitter 19 arranged perpendicular to the first 22 and the second 24 waveguide channel branch. FIG. 11 shows a cut-out of a second variation of a waveguide splitter 19 wherein the waveguide channel 9 of the shown variation is in the area of the primary port 21 of the splitter 19 arranged parallel to the first 22 and the second 24 waveguide channel branch. FIGS. 12-13 show a first variation of the array 14 of openings 13 and a waveguide splitter 19 with the first 22 and the second 24 waveguide channel branch, wherein the splitter 19 and the first 22 and second 24 waveguide channel branch are arranged in the back part 7 of the antenna assembly 6. FIGS. 14-15 show a second variation of the array 14 of openings 13 and the waveguide splitter 19 with the first 22 and the second 24 waveguide channel branch, wherein the openings 13 end in one funnel 28, FIGS. 16-17 show a third variation of the of the array 14 of openings 13 and the waveguide splitter 19 with the first 22 and the second 24 waveguide channel branch, wherein the splitter 19 and the first 22 and second 24 waveguide channel branch are arranged in the front 8 and the back part 7 of the antenna assembly 6. FIGS. 18-19 show a fourth variation of the of the array 14 of openings 13 and the waveguide splitter 19 with the first 22 and the second 24 waveguide channel branch, wherein the splitter 19 and the first 22 and second 24 waveguide channel branch are arranged in the front part 8 of the antenna assembly 6. FIGS. 20-21 show a fifth variation of the of the array 14 of openings 13 and the waveguide splitter 19 with the first 22 and the second 24 waveguide channel branch, wherein the openings 13 are arranged laterally offset with respect to each other. FIGS. 22-23 show a sixth variation of the of the array 14 of openings 13 and the waveguide splitter 19 with the first 22 and the second 24 waveguide channel branch, wherein the openings are arranged laterally offset with respect to each other and the first 22 and second 24 waveguide channel branch comprise a ridge 34. FIGS. 24 *a, b, c*-25 show a perspective view from above (FIG. 24 *a-c*) of a first alternative variation of the antenna assembly with pillars and in an exploded view (FIG. 25) of a second variation. FIG. 26 shows a second variation of the antenna device 1 according to FIG. 1 in a perspective view from the front and above with horn shaped second waveguide apertures 11. FIG. 27 shows the antenna device 1 according to FIG. 26 in a perspective and exploded view from above with horn shaped second waveguide apertures 11. FIG. 28 shows a sectional perspective view of a third variation of the wave-guide splitter 19 from above. FIG. 29 shows a sectional perspective view of a fourth variation of the waveguide splitter 19 from above. FIGS. 30 and 31 show a perspective view from the rear and above (FIG. 30) and the front (FIG. 31) from the splitter 19 and a seventh variation of the array 14 of openings 13, wherein a cascade of splitters 19 is arranged between the first 22 and second 24 waveguide channel branch and the horn shaped second waveguide apertures 11. FIGS. 32 and 33 show a perspective view from the rear and above (FIG. 32) and the front (FIG. 33) from the splitter 19 and an eight variation of the array 14 of openings 13, wherein the openings 13 are angular offset (a) with respect to the first 22 and second 24 waveguide channel branches. FIGS. 34 and 35 show a perspective view from the rear and above (FIG. 34) and the front (FIG. 35) from the splitter 19 and a ninth variation of the array 14 of openings 13. FIGS. 36 and 37 show a perspective view from the rear and above (FIG. 36) and the front (FIG. 37) from the splitter 19 and a tenth variation of the array 14 of openings 13. FIGS. 38 and 39 show a perspective view from the rear and above (FIG. 38) and the front (FIG. 39) from the splitter 19 and an eleventh variation of the array 14 of openings, wherein the openings 13 end in a common funnel 28. FIG. 40 shows a sectional perspective view of the distal end of the waveguide channel 9 with thereto interconnected folded horn from the front and above. FIG. 41 shows a sectional perspective view of the distal end of the waveguide channel 9 with thereto interconnected folded horn 35 according to FIG. 40 from the back and above. FIG. 42 shows a lateral view of the splitter 19 and a twelfth variation of the array 14 with an asymmetrically arranged funnel 28 cavity. FIG. 43 shows a diagram showing the radiation pattern of the antenna device 1 with an asymmetrically arranged funnel 28 cavities. FIG. 44 shows a perspective view from the rear and above from the splitter 19 and a thirteenth variation of the array 14 of openings. FIG. 45 shows a perspective view from the rear and above from the splitter 19 and a fourteenth variation of the array 14 of openings with a funnel 28 cavity. FIG. 46 shows a perspective view from the rear and above from the splitter 19 and a fifteenth variation of the array 14 of openings designed as multiple branch arrays 14. FIG. 47 shows a perspective view from the rear and above from the splitter 19 and a sixteenth variation of the array 14 designed as multiple branch arrays 14.

As best visible in FIGS. 1-4, the antenna device 1 as shown comprises a printed circuit board (PCB) 2 with a thereon arranged electronic component 3. The electronic component 3 is interconnected via transmission lines 4 to radiating elements 5. Each radiating element 5 is interconnected to a respective waveguide channel 9 of an antenna element 12 arranged in the antenna assembly 6 by a rear first waveguide aperture 10. At the opposite end, the waveguide channel 9 ends in a second waveguide aperture 11 which serves to transmit and receive a signal. The antenna assembly 6, which in general acts as a MIMO antenna, comprises several antenna elements 12. The antenna assembly 6 preferably comprises a back part 7 and a front part 8, which can e.g., be made of metal and/or metallized plastic and/or any other material conductive at the surface. The radiating apertures 11, respectively the second waveguide apertures 11, for each antenna element 12 are in the shown variation implemented in the front part 8, whereas the feedings apertures 10, respectively first waveguide apertures 10, of the individual antenna elements 12 are implemented in the back part 7. Each first waveguide aperture 10 (feeding waveguide aperture 10) serves as the input of the respective individual antenna element 12. An RF signal coming from the electronic component 3 (e.g., radar chip mounted on the PCB board 2) is coupled into the first waveguide aperture 10 and propagates towards the respective antenna aperture through the air-filled waveguide channel 9 and the air-filled waveguide splitter 19. The routing of each waveguide channel 9 is optimized to allow impedance matching and low-loss transmission of the RF signal, to maintain a specified phase relation between the different antenna elements 12, and to allow a proper manufacturing process. The cross section 33 of each waveguide channel 9 is optimized to guarantee a high-accuracy manufacturing of the back 7 and front 8 part. The walls of the first waveguide aperture 10, the waveguide channel 9, the waveguide splitter 19, and the array 14 of openings 13 are usually metallic or metallized. If appropriate, some of the antenna elements 12 may serve as transmitter (TX) only and some of the elements may serve as receiver (RX) only. Each radiating aperture 11 consists of an array 14 of openings 13 arranged in a front face 17 of the upper front part 8. Each feeding element consists of a feeding aperture 10 arranged in a back face 16 of the back part 7 of the Antenna assembly 6. The back part 7 of the antenna assembly 6 in the shown variation comprises protrusions 29 that protrude from the back face 16 of the back part 7, configured to interconnect the first waveguide aperture 10 to the electronic component 3.

FIGS. 5-6 show a perspective view of a variation of the antenna assembly according to FIGS. 1-4 from above (FIG. 36) and the rear (FIG. 37) and a side view (FIG. 38). The front part 8 and the back 7 part of the shown variation of the antenna assembly 6 are partially skeletonized. The skeletonized design allows the font face 15 of the back part and the back face 16 of the front part are only partially interconnected to each other along the channel borders and the circumferential edges. This leads to a better fit between the front 8 part and the back part 7.

As best visible in FIGS. 7 to 9 the shown variation according to FIG. 7 and the therein arranged number of antenna elements 12 of the herein shown variation are chosen for illustration purposes only. In a real application, different arrangements and different numbers of antenna elements can be implemented. As can be best seen from FIG. 7 the back part 7 and/or the front part 8 of the antenna device 1 are made by injection molding of a plastic material and the back part 7 and/or the front part 8 are made of metal and/or metallized plastic and/or any other material conductive at the surface. The back part 7 and front part 8 of the antenna assembly 6 as shown by FIG. 7 are interconnected to each other along a front face 15 of the back part 7 and a back face 18 of the front part 8 and wherein at least one waveguide channel 9 extends at least partially in the front face 15 of the back part 7 and/or the back face 18 of the front part 8.

As best visible from FIGS. 8 and 9 the shown variation comprises waveguide channels 9 which are with respect to the first waveguide aperture 10, at the distal end interconnected to a splitter 19 by a primary port 21. The splitter 19 of the shown variation is configured to split the power of a signal to be sent into a first waveguide channel branch 22 interconnected to a first secondary port 23 of the splitter 19 and a second waveguide channel branch 24 interconnected to a second secondary port 25 of the splitter 19. The waveguide channels 9 of the shown variations in FIGS. 8 and 9 comprise in the area of the primary port of the splitter 19 two dented corners which are arranged opposite to each other and which are designed as deflection elements 27. The deflection elements 27 of the shown variation are configured to twist the polarization of the E-field. The E-field is twisted by the shown deflection elements 27 such that the electric field is essentially twisted from the horizontal direction, to the vertical direction by 90 degrees and to implement impedance matching, wherein the horizontal direction is essentially perpendicular and the vertical direction is essentially parallel to the first 10 and second 11 waveguide aperture.

FIG. 8 schematically shows the hollow structures (i.e., air-filled waveguide-based elements) inside the antenna assembly 6 in a positive manner. As can be best seen in FIG. 8 the first waveguide aperture 10 and the second waveguide aperture 11 are laterally offset with respect to each other. It can be further seen, that the length of the waveguide channel 9 is substantially larger than the length of the first waveguide channel branch 22 and the length of the second waveguide channel branch 24 combined. As best visible in FIG. 9 the shown waveguide channel 9 comprises at least a waveguide cross section 33 that is essentially rhomb shaped. In alternative variations also other geometries out of the group of the following elements or a combination thereof can be used: Rectangle, rhomb, ellipse, circle, wherein a main extension direction of the cross section 33 is essentially parallel to the first 10 and second 11 waveguide aperture. The first 22 and the second waveguide channel branch 24 of the shown variation each comprise at least one radiating openings 13, wherein the radiating openings 13 are arranged co-linear with respect to a center line 20. The number of openings 13 shown in FIG. 9 are for illustration purpose only, and can be increased to tune the radiation pattern in the elevation plane (i.e., y-z plane). Any additional opening 13 can be added so that the horizontal displacements of the waveguide sections happens in a staggered way, that is, if one waveguide section is displaced in the +x direction, the following one will be displaced in the −x direction As best visible from FIGS. 10 and 11 the two shown variations of the first waveguide channel branch 22 and the second waveguide channel branch 24 are arranged coaxial with respect to each other. As visible in FIG. 10, the waveguide channel 9 of the shown variation is in the area of the primary port 21 of the splitter 19 arranged parallel to the first 22 and the second 24 waveguide channel branch. In the alternative variation shown in FIG. 11 the waveguide channel 9 of the shown variation is in the area of the primary port 21 of the splitter 19 arranged perpendicular to the first 22 and the second 24 waveguide channel branch. The splitter can comprise a necking 26, which is configured to divide the signal between the first 22 and the second 24 waveguide channel branch. As can be seen from FIG. 10, in the first variation the necking 26 is arranged centered between the first secondary port 23 and the second secondary port 25, wherein the signal power is split equally between the first 22 and the second 24 waveguide channel branch. Alternatively, the necking 26 can also be arranged with offset with respect to the center between the first secondary port 23 and the second secondary port 25, such that the signal power is split non-equally between the first 22 and the second 24 waveguide channel branch. Both variations of the splitter 19 according to FIGS. 10 and 11 comprise at least one deflection element 27 configured to twist the polarization of the E-field. The deflection elements 27 of the splitter 19 according to FIG. 10 are configured such that the polarization of the first waveguide channel branch 22 and the second waveguide channel branch 24 is equally polarized. The deflection elements 27 of the splitter 19 according to FIG. 11 are configured such that the polarization of the first waveguide channel branch 22 and the second waveguide channel branch 24 are reversed. As shown in FIGS. 10 and 11, the at least one deflection element 27 is arranged inside and/or outside of the waveguide channel 9 and/or the splitter 19 and comprises at least one out of the group of the following elements or a combination thereof: Step, recess, channel, bump, dented corner which are designed such that they protrude inside and/or outside the cross-section of the waveguide channel 9 and/or the splitter 19.

FIGS. 12-19 show a number of preferred variations. All variations shown in these figures comprise openings that are arranged collinear with respect to each other. Having the openings 13 aligned is particularly advantageous as it allows to realize symmetric patterns and avoid unwanted lobes outside of the main radiation planes. That is achieved with the present disclosure by altering the electric field and electric current distribution of the air-filled horizontal waveguide. The staggered design of all these variations generates a discontinuity that allows to twist the standard current distribution of a rectangular-like waveguide 9. The displacement is optimized to have the current maxima in phase at a distance of half guided wavelength and aligned in y direction, which allows for in-line placement of the radiating openings 13.

FIGS. 12-13 show a perspective view from above (FIG. 12) and the rear (FIG. 13) and a side view (FIG. 14) from a first variation of the array 14 of openings 13. The figures show the center feeding of the array 14 of radiating openings 13 by a compact waveguide splitter 19 that is arranged essentially parallel to the first 22 and the second 24 waveguide channel branch. The waveguide splitter 19 of the shown variation equally splits the vertically oriented signal entering through the waveguide primary port 21 into two horizontally oriented signals with the help of the necking. The split signal excites through the first 23 and second 25 secondary port. The first part of the signal enters the first 22 and second part enters the second 24 waveguide channel branch with the help of the necking 27. The figures show a variation where every radiating opening 13 is coupled to an individual focusing cavity 28. This variation allows to increase the size of the radiating aperture, with direct positive impact on the directivity (and consequently gain).

FIGS. 14-15 show a perspective view from above (FIG. 18) and the rear (FIG. 19) and a side view (FIG. 20) from a second variation of the array 14 of openings 13. The figures show the center feeding of the array 14 of radiating openings 13 by a compact waveguide splitter 19 that is arranged essentially parallel to the first 22 and the second 24 waveguide channel branch. The waveguide splitter 19 of the shown variation equally splits the vertically oriented signal entering through the waveguide primary port 21 into two horizontally oriented signals with the help of the necking. The figures show a variation where a single focusing cavity 28 is arranged on the radiating openings 13. This variation allows to increase the size of the radiating aperture, with direct positive impact on the directivity (and consequently gain). As shown in FIGS. 16-17 show a perspective view from above (FIG. 24) and the rear (FIG. 25) and a side view (FIG. 26) from a third variation of the array 14 of openings 13 and show the center feeding of the array 14 of radiating openings 13 by a compact waveguide splitter 19 that is arranged essentially perpendicular to the first 22 and the second 24 waveguide channel branch. The waveguide splitter 19 of the shown variation equally splits the vertically oriented signal entering through the waveguide primary port 21 into two horizontally oriented signals with the help of the necking. The split signal excites through the first 23 and second 25 secondary port. The first part of the signal enters the first 22 and second part enters the second 24 waveguide channel branch with the help of the necking 26.

FIGS. 18-19 show a perspective view from above (FIG. 27) and the rear (FIG. 28) and a side view (FIG. 29) from a fourth variation of the array 14 of openings 13 and show the center feeding of the array 14 of radiating openings 13 by a compact waveguide splitter 19 that is arranged essentially parallel to the first 22 and the second 24 waveguide channel branch. The waveguide splitter 19 of the shown variation equally splits the vertically oriented signal entering through the waveguide primary port 21 into two horizontally oriented signals with the help of the necking 26. The split signal excites through the first 23 and second 25 secondary port. The first part of the signal enters the first 22 and second part enters the second 24 waveguide channel branch with the help of the necking 27.

FIGS. 20-21 show a perspective view from above (FIG. 30) and the rear (FIG. 31) and a side view (FIG. 32) from a fifth variation of the array 14 of openings 13 show the center feeding of the array 14 of radiating openings 13 by a compact waveguide splitter 19 that is arranged essentially perpendicular to the first 22 and the second 24 waveguide channel branch. The waveguide splitter 19 of the shown variation equally splits the vertically oriented signal entering through the waveguide primary port 21 into two horizontally oriented signals with the help of the necking 26. The split signal excites through the first 23 and second 25 secondary port. The first part of the signal enters the first 22 and second part enters the second 24 waveguide channel branch with the help of the necking 26. In the shown variation the openings of the array 14 are arranged offset with respect to each other and a centerline 20.

FIGS. 22-23 show a perspective view from above (FIG. 33) and the rear (FIG. 34) and a side view (FIG. 35) from a sixth variation of the array of openings. The variation of FIGS. 33-35 is essentially similar to the variation of FIGS. 20-21 except for the ridge 34. The ridge 34 is arranged to be able to increase the surface area of the first 22 and second 24 channel branch sand therefore the resulting cross section 33 of the waveguide channel branches can be reduced. In the shown variation the center feeding of the array 14 of radiating openings 13 is realized by a compact waveguide splitter 19 that is arranged essentially perpendicular to the first 22 and the second 24 waveguide channel branch. The waveguide splitter 19 of the shown variation equally splits the vertically oriented signal entering through the waveguide primary port 21 into two horizontally oriented signals with the help of the necking. The split signal excites through the first 23 and second 25 secondary port. The first part of the signal enters the first 22 and second part enters the second 24 waveguide channel branch with the help of the necking 27. As shown in FIGS. 24 *a, b, c* and 25 show alternative variations of an antenna assembly 6 wherein the back part 7 and/or the front part 8 compromise a number of pillars 30 arranged on the front face of the back part 15 or the back face of the front part 18 configured to form a waveguide channel 9 and guide the signal. In this case, the pillars 30 are arranged to enable a bandgap structure which is configured to compensate for potential manufacturing and assembly tolerances between the front 8 and the back 7 part, since a direct ohmic contact is not necessarily needed between them. All variations shown in FIGS. 24 *a, b, c* and 25 comprise electromagnetic band gap (EBG) structures around the hollow waveguide channels 9. An electromagnetic band gap structure allows to block electromagnetic waves at a given range of frequencies, behaving as a conductive wall without the need to have direct and/or ohmic contact between the front 8 and back 7 part implementing a waveguide structure. They are usually achieved by forming periodic patterns, such as mushrooms in PCB technology or pillars 30 in waveguide technology.

As best visible in FIGS. 26 and 27, the second variation of the antenna assembly 6 comprises second waveguide apertures 11 which are horn shaped. The waveguide channels 9 interconnected to an antenna element 12 are arranged in the antenna assembly 6 by a rear first waveguide aperture 10. At the opposite end, the waveguide channel 9 ends in a second waveguide aperture 11 which serves to transmit and/or receive a signal. The shown variation of the antenna assembly 6, which in general acts as a MIMO antenna, comprises several antenna elements 12. The antenna assembly 6 preferably comprises a back part 7 and a front part 8, which can e.g., be made of metal and/or metallized plastic and/or any other material conductive at the surface. The radiating apertures 11, respectively in the shown variation the horn shaped second waveguide apertures 11, for each antenna element 12 are in the shown variation implemented in the front part 8, whereas the feedings apertures 10, respectively first waveguide apertures 10, of the individual antenna elements 12 are implemented in the back part 7. The routing of each waveguide channel 9 is optimized to allow impedance matching and low-loss transmission of the RF signal, to maintain a specified phase relation between the different antenna elements 12, and to allow a proper manufacturing process. The cross section 33 of each waveguide channel 9 is optimized to guarantee a high-accuracy manufacturing of the back 7 and front 8 part. The walls of the first waveguide aperture 10, the waveguide channel 9, the waveguide splitter 19, and the array 14 of openings 13 are usually metallic or metallized. If appropriate, some of the antenna elements 12 may serve as transmitter (TX) only and some of the elements may serve as receiver (RX) only. In the shown variation the antenna assembly 6 comprises a number of horn shaped second waveguide apertures 11, wherein several of the antenna elements 12 comprise a radiating aperture which is designed as an array 14 of openings 13 arranged in a front face 17 of the upper front part 8. The remaining antenna elements 12 comprise openings 13 which are designed as horn shaped second waveguide apertures 11. Each feeding element consists of a feeding aperture 10 arranged in a back face 16 of the back part 7 of the antenna assembly 6. As best visible in FIG. 27, a flare section 36 is arranged adjacent to the horn shaped second waveguide aperture 11. As can be seen in FIG. 27, the flare section 36 is designed as an essentially trapezoidal shaped waveguide channel.

FIGS. 28 and 29 show a third (FIG. 28) and a fourth (FIG. 29) variation of the wave-guide splitter 19. Similar to the first and second variation of the waveguide splitter 19 according to FIGS. 10 and 11, the third and fourth variation each comprise at least one deflection element 27 configured to twist the polarization of the E-field. The deflection elements 27 of the splitter 19 are configured such that the polarization of the first waveguide channel branch 22 and the second waveguide channel branch 24 is equally polarized. The polarization twist of the fourth variation of the splitter 19 according to FIG. 28 is achieved with different cross sections between the primary port 21 and the first 23 and second 25 secondary port of the waveguide splitter 19.

FIGS. 30 and 31 show a seventh variation of the array 14 of openings 13 from a perspective view from the rear and above (FIG. 30) and the front and above (FIG. 31). The figures show a variation with center feeding of the array 14 of radiating openings 13 by a compact waveguide splitter 19 that is arranged essentially parallel to the first 22 and the second 24 waveguide channel branch. The waveguide splitter 19 of the shown variation equally splits the vertically oriented signal entering through the waveguide primary port 21 into two horizontally oriented signals with the help of two deflection elements 27 designed as dented corners. The split signal excites through the first 23 and second 25 secondary port. The first part of the signal enters the first 22 and second part enters the second 24 waveguide channel branch. In the shown variation the first 22 and the second 24 waveguide channel branch each comprise a number of additional splitters 19 which interconnect the first 22 and the second 24 waveguide channel branch with a number of horn shaped second waveguide apertures 11. The number of splitters 19 is arranged collinear with respect to each other. Deflection elements 27 are arranged at a distal end of the first 22 and second 24 waveguide channel branches and/or at least one necking 26. The amplitude and phase relation between the two horn shaped second waveguide apertures 11 can be tuned by neckings 26 and deflection elements 27 arranged at the first 22 and/or second 24 waveguide channel branch and/or the second waveguide apertures 11.

FIGS. 32 and 33 show an eighth variation of the array 14 of openings 13 from a perspective view from the rear and above (FIG. 32) and the front and above (FIG. 33). The shown variation differs from the seventh variation in that the horn shaped second waveguide apertures 11 are angular offset (a) with respect to the splitter 19. The angular offset is configured to introduce a polarization twist in the respective horn shaped second waveguide aperture 11 such that the polarization of the radiation pattern is altered. Good results can be achieved when the polarization is changed from pure horizontal (0°) to slant)(±45° or vertical (90°) polarization. The shown variation is configured to introduce a change in the polarization to a slant polarization of essentially 45°. The polarization is twisted by a series of deflection elements 27 such that a smooth transition is achieved. The advantage of the shown variation is that the polarization can be changed without an additional antenna layer. FIGS. 34 and 35 show a ninth variation of the array 14 of openings 13 from a perspective view from the rear and above (FIG. 34) and the front and above (FIG. 35). The shown variation comprises a waveguide splitter 19 that is arranged essentially parallel to the first 22 and the second 24 waveguide channel branch. Besides the waveguide splitter 19 the shown array further comprises vertical splitters designed as horn shaped second waveguide aperture.

FIGS. 36 and 37 show a tenth variation of the array 14 of openings 13 from a perspective view from the rear and above (FIG. 36) and the front and above (FIG. 37). The shown variation of the array comprises a number of deflection elements 27 designed to twist the electric field from the vertical to the horizontal plane and, at the same time, to implement impedance matching. The waveguide splitter 19 is designed to fold the electric field keeping impedance matching. The necking 26 is designed to split the signal into the first 22 and second 24 waveguide channel branch. Depending on the design of the necking 26 an asymmetric power/phase distribution between the first 22 and second 24 waveguide channel branch can be achieved. FIGS. 38 and 39 show an eleventh variation of the array 14 of openings 13 from a perspective view from the rear and above (FIG. 38) and the front and above (FIG. 39). The shown variation differs from the tenth variation in that a focusing cavity 28 is arranged on top of the array.

FIGS. 40 and 41 show a sectional perspective view of the distal end of the waveguide channel 9 with thereto interconnected folded horn 35 from the front and above (FIG. 40) and from the back and above (FIG. 41). A flare section 36 is arranged adjacent to the horn shaped second waveguide aperture 11. The shown flare section 36 is arranged essentially perpendicular with respect to the waveguide channel 9 and the at least one opening 13 is arranged essentially parallel to the waveguide channel 9. Alternatively, or in addition, as shown in FIGS. 40 and 41, the horn shaped second waveguide aperture 11 can comprise at least one ridge 37. In the shown variation the horn shaped second waveguide aperture 11 comprises two ridges 37 which are arranged opposite to each other. The ridge 37 is configured to introduce an electrical delay of the propagating mode in the central part of the waveguide, which contributes to a further reduction of the phase error and obtaining higher values of directivity. As can be seen in FIGS. 40 and 41, the flare section 37 is designed as an essentially trapezoidal shaped waveguide channel. At least one of the walls of the flare section 36 is typically arranged angular with respect to the horn shaped second waveguide aperture 11. The flare angle ((3) of the shown variation of the flare section 36 starts in the horizontal plane, which allows to obtain the same efficiency as known horns but with reduced height. The shown deflection elements 27 in form of dented corners introduce a 90° rotation of the E-field. The flare section 36 is designed as horizontally oriented waveguide. In the shown variation the waveguide of the waveguide channel 9 and/or the horn shaped second waveguide aperture 11 are designed as vertically oriented waveguides. The E-field is folded from a horizontal orientation within the waveguide channel 9 to a vertical orientation within the flare section 36 and/or is folded from the vertical orientation within the flare section 36 to a horizontal orientation within the opening 13. Deflection elements 27 can be arranged at the waveguide channel 9 and/or the opening 13 such that the E-filed can be folded. In case of received signals, the orientation of the E-field is vice versa.

FIG. 42 shows a lateral view of the splitter 19 and a twelfth variation of the array 14 of openings with an asymmetrically arranged funnel 28 cavity. As can be seen the funnel cavity is laterally displaced with respect to the radiating aperture 11. The asymmetrically arranged funnel 28 cavity creates a tilt in the radiation properties of the antenna device 1. The impact of the lateral displacement can be seen in FIG. 43. FIG. 43 shows a diagram showing the radiation pattern of the antenna device 1 with an asymmetrically arranged funnel 28 cavity. Having a local maximum in the antenna directivity can help to focus the antenna energy in certain areas. The tilted pattern can be useful to have a further range in given areas of the radar. Good results can be for example achieved in automotive applications as the tilted pattern makes it possible to have a locally wider range. Therefore, for example a laterally incoming car can be detected earlier on by the antenna device 1.

FIG. 44 shows a perspective view from the rear and above from the splitter 19 and a fourteenth variation of the array 14 of openings. An outgoing signal is divided in two signals and feed into the first 22 and the second 24 waveguide channel branch. Both waveguide channel branches 22, 24 comprise a first section with deflection elements that change the polarization from horizontal to vertical. The signals are each further split in two new branches which each contain two arrays 14 of radiating apertures each. As can be seen the cross sections of the openings 13 differ. The array comprises smaller openings 40 and wider openings 41. An array 14 comprising openings 13 with differing cross sections causes a phase difference between the radiation of each opening 13. The phase difference causes a tilt of the overall radiation pattern of the array 14. As can be seen in FIG. 45, the splitter 19 and a fourteenth variation of the array 14 of openings shown by FIG. 44 can be also combined with an asymmetrically arranged funnel 28 cavity. The funnel can be asymmetrically arranged with a lateral displacement to obtain the effect as shown by the diagram of FIG. 43.

FIGS. 46 and 47 show two variations of splitters 19 with multiple branch arrays 14. In case that more directive or complex radiation patterns are required, multiple slot arrays 14 can be arranged in the horizontal plane with the appropriate feeding network. FIG. 46 shows a perspective view from the rear and above from the splitter 19 and a fifteenth variation of the array 14 of openings designed as multiple branch arrays 14. The first 38 and the second 39 column of arrays 14 are arranged as a corporate network wherein both columns 38, 39 are fed with equal amplitude and phase for maximum directivity. FIG. 47 shows a perspective view from the rear and above from the splitter 19 and a sixteenth variation of the array 14 designed as multiple branch arrays 14. The shown first 38 and second 39 columns of arrays 14 are arranged as a serial feeding network. The second columns 39 are feed with a phase shift which creates a beam tilt and/or maximize the directivity.

Rather, the words used in the specification are words of description rather than limitation, and it is understood that various changes may be made without departing from the spirit and scope of the invention.

The invention claimed is:

1. An antenna device comprising:

a. a printed circuit board and a thereon arranged electronic component;

b. an antenna assembly comprising at least two individual antenna elements interconnected to the electronic component configured to transmit and/or receive a signal, wherein c. the antenna elements each comprise at least one waveguide channel interconnecting in the antenna assembly i. a first waveguide aperture arranged at a back face of the antenna assembly, said first waveguide aperture being interconnected to the electronic component and configured to transmit and/or receive signal, and ii. a second waveguide aperture arranged at a front face of the antenna assembly configured to transmit and/or receive signal, wherein d. the at least one waveguide channel is adapted to maintain or twist the polarization of the E-field, such that i. the polarization remains in the horizontal direction (i.e. in the x-y plane of the antenna assembly) from the first waveguide aperture to the second waveguide aperture, or ii. the polarization is twisted from the horizontal direction to the vertical direction (i.e. perpendicular to the x-y plane of the antenna assembly) from the first waveguide aperture to the second waveguide aperture; and e. at least one waveguide channel interconnected to a waveguide splitter, the waveguide splitter comprising at least one deflection element configured to twist the polarization of the E-field, such that:

i. the polarization of the first waveguide channel branch and the second waveguide channel branch are equally polarized; or ii. the polarization of the first waveguide channel branch and the second waveguide channel branch are twisted.

2. The antenna device according to claim 1, wherein at least one waveguide channel is, with respect to the first waveguide aperture, at the distal end interconnected to a splitter by a primary port, wherein the splitter is configured to split a signal to be sent into:

a. a first waveguide channel branch interconnected to a first secondary port of the splitter; and b. a second waveguide channel branch interconnected to a second secondary port of the splitter.

3. The antenna device according to claim 1, wherein the splitter comprises a necking, which is configured to divide the signal between the first and the second waveguide channel branch.

4. The antenna device according to claim 3, wherein the necking is:

a. arranged centered between the first secondary port and the second secondary port, wherein the signal power is split equally between the first and the second waveguide channel branch; or b. arranged with offset with respect to the center between the first secondary port and the second secondary port, wherein the signal power is split non-equally between the first and the second waveguide channel branch.

5. The antenna device according to claim 1, wherein the at least one deflection element is configured to twist the polarization of the E-field, such that the electric field is essentially twisted from the horizontal direction, to the vertical direction by 90 degrees.

6. The antenna device according to claim 1, wherein the waveguide splitter comprises the at least one deflection element arranged adjacent to the primary port configured to twist the polarization of the E-field from the horizontal direction, to the vertical direction by 90 degrees and an additional at least one deflection element arranged adjacent to the first secondary port and the second secondary port configured to twist the polarization back from the vertical direction to the horizontal direction.

7. The antenna device according to claim 1, wherein the at least one deflection element is essentially arranged inside the waveguide channel and/or the waveguard splitter and comprises at least one or more of the group of the following elements: step, recess, channel, bump, or dented corner which are designed such that they protrude inside and/or outside the cross-section of the waveguide channel and/or the waveguard splitter.

8. The antenna device according to claim 1, wherein the waveguide channel comprises in the area of the primary port of the waveguard splitter two dented corners which are arranged opposite to each other and which are designed as deflection elements.

9. The antenna device according to claim 1, wherein the waveguide channel comprises at least a cross section out of at least one of the group of the following elements: rectangle, rhombus, ellipse, circle, wherein a main extension direction of the cross section is essentially parallel to the first and second waveguide aperture.

10. The antenna device according to claim 2, wherein the first and the second waveguide channel branch each comprise at least one radiating opening, wherein the radiating openings are arranged co-linear with respect to a center line.

11. The antenna device according to claim 10, wherein the first and the second waveguide channel branch are designed in a staggered design configured to alter the field such that the at least one radiating opening of the first and the at least one radiating opening of the second waveguide channel branch is aligned collinear with respect to each other.

12. The antenna device according to claim 2, wherein the waveguide channel, the first and/or the second waveguide channel branch comprise a ridge in form of at least one of the following elements or a combination thereof: Channel, lateral necking, a longitudinal inwardly directed protrusion, each configured to increase the circumferential channel surface, such that the cross section is minimized.

13. The antenna device according to claim 10, wherein the at least one radiating opening of the first and the at least one radiating opening of the second waveguide channel branch are interconnected to at least one funnel, wherein the funnel is interconnected to the second waveguide aperture.

14. The antenna device according to claim 1, wherein the antenna assembly comprises a back part and front part interconnected to each other along a front face of the back part and a back face of the front part and wherein at least one waveguide channel extends at least partially in the front face of the back part and/or the back face of the front part.

15. The antenna device according to claim 14, wherein the back part and/or the front part comprises a number of pillars arranged on the front face of the back part or the back face of the front part configured to form the contour of a waveguide channel and/or the waveguard splitter and/or the first and second waveguide channel branch.

16. The antenna device according to claim 15, wherein electromagnetic band gap structures are arranged essentially around the at least one hollow waveguide channel which allows to block electromagnetic waves at a given range of frequencies, behaving as a conductive wall without the need to have direct and/or ohmic contact between the front part and the back part implementing a waveguide structure.

17. An antenna device comprising a. a printed circuit board and a thereon arranged electronic component;

b. an antenna assembly comprising at least two individual antenna elements interconnected to the electronic component configured to transmit and/or receive a signal, wherein c. the antenna elements each comprise at least one waveguide channel interconnecting in the antenna assembly i. a first waveguide aperture arranged at a back face of the antenna assembly, said first waveguide aperture being interconnected to the electronic component and configured to transmit and/or receive signal, and ii. a second waveguide aperture arranged at a front face of the antenna assembly configured to transmit and/or receive signal, wherein d. at least one deflection element is arranged at a splitter of the at least one waveguide channel, which deflection element is configured to introduce a 90° rotation of the E-field, and is configured to rotate the E-field from a horizontal direction to a vertical direction.

18. The antenna device according to claim 17, wherein the at least one deflection element comprises at least one or more of the group of the following elements: step, recess, channel, bump, or dented corner, which are designed such that they protrude inside and/or outside the cross-section of the waveguide channel and/or the splitter.

* * * * *